(12) United States Patent
Zhang

(10) Patent No.: US 11,359,823 B2
(45) Date of Patent: Jun. 14, 2022

(54) INTELLIGENT HOT WATER HEATING SYSTEM WITH STRATIFIED TEMPERATURE-HEATING CONTROL STORAGE TANK

(71) Applicant: Yanda Zhang, Davis, CA (US)

(72) Inventor: Yanda Zhang, Davis, CA (US)

( * ) Notice: Subject to any disclaimer, the term of this patent is extended or adjusted under 35 U.S.C. 154(b) by 683 days.

(21) Appl. No.: 16/358,530

(22) Filed: Mar. 19, 2019

(65) Prior Publication Data
US 2019/0293303 A1 Sep. 26, 2019

Related U.S. Application Data

(60) Provisional application No. 62/674,846, filed on May 22, 2018, provisional application No. 62/645,400, filed on Mar. 20, 2018.

(51) Int. Cl.
*F24D 19/10* (2006.01)
*F24D 17/00* (2022.01)
*F24D 17/02* (2006.01)

(52) U.S. Cl.
CPC ..... *F24D 19/1063* (2013.01); *F24D 17/0047* (2013.01); *F24D 17/0078* (2013.01); *F24D 17/02* (2013.01); *F24D 19/106* (2013.01)

(58) Field of Classification Search
None
See application file for complete search history.

(56) References Cited

U.S. PATENT DOCUMENTS

| | | | | | |
|---|---|---|---|---|---|
| 1,731,368 | A | * | 10/1929 | Baker | F24D 3/08 122/14.22 |
| 2,486,833 | A | * | 11/1949 | Freund | F25B 27/007 62/235.1 |
| 2,833,273 | A | * | 5/1958 | Miller | F24D 3/082 122/14.3 |
| 3,008,300 | A | * | 11/1961 | Ryan | F25B 21/02 62/3.3 |
| 3,575,157 | A | * | 4/1971 | Whittel, Jr. | F24D 3/08 122/14.2 |
| 3,952,182 | A | * | 4/1976 | Flanders | G05D 23/1912 392/466 |
| 4,182,489 | A | * | 1/1980 | Lessieur | F24D 11/002 126/586 |

(Continued)

*Primary Examiner* — Thor S Campbell
(74) *Attorney, Agent, or Firm* — Stephen E. Zweig

(57) ABSTRACT

Hot water heating system comprising one or more water heaters with at least one water heating mechanism, and a heating-control storage tank generally configured to store heated water in a temperature stratified manner where hotter water tends to be separated from cold water. The heating-control storage tank can receive thermal energy or hot water from the water heater, send thermal energy or water to the water heater as its makeup water, and provide hot water directly to end users. The water heater may or may not be used to provide hot water to end users. The system is electronically controlled using a processor, various sensors, a recirculation pump, and electronically actuated valves. Depending on hot water needs and energy costs, the system controls water heating schedule and amount of hot water stored in the heating-control storage tank by changing system operation modes to minimize energy costs while providing reliable service.

22 Claims, 9 Drawing Sheets

(56) References Cited

U.S. PATENT DOCUMENTS

| | | | | |
|---|---|---|---|---|
| 4,390,008 A * | 6/1983 | Andrews | F24D 17/02 | 126/611 |
| 4,412,526 A * | 11/1983 | DeGrose | F24D 3/08 | 122/14.1 |
| 4,441,902 A * | 4/1984 | Jardine | F24D 17/02 | 137/592 |
| 4,523,629 A * | 6/1985 | Copeland | F28D 20/0039 | 165/104.19 |
| 4,590,992 A * | 5/1986 | Tamblyn | F24D 11/002 | 165/104.19 |
| 4,598,694 A * | 7/1986 | Cromer | F28D 20/0039 | 122/19.1 |
| 4,632,065 A * | 12/1986 | Kale | F24H 1/18 | 122/19.1 |
| 4,632,066 A * | 12/1986 | Kideys | F24H 1/205 | 122/18.2 |
| 4,977,885 A * | 12/1990 | Herweyer | F24D 17/00 | 122/14.31 |
| 5,056,712 A * | 10/1991 | Enck | G05D 23/1904 | 236/20 R |
| 5,701,387 A * | 12/1997 | McGugan | F24D 17/0073 | 122/13.3 |
| 6,907,923 B2 * | 6/2005 | Sienel | F28D 20/0039 | 165/236 |
| 7,298,968 B1 * | 11/2007 | Boros | F24D 17/00 | 392/441 |
| 7,460,769 B2 * | 12/2008 | Ryks | F24H 1/08 | 392/441 |
| 7,644,686 B2 * | 1/2010 | Threatt | F24H 1/18 | 122/37 |
| 7,773,868 B2 * | 8/2010 | Moore | F24D 19/1051 | 392/490 |
| 7,817,907 B2 * | 10/2010 | Yui | H05B 3/82 | 392/450 |
| 8,422,870 B2 * | 4/2013 | Nelson | F25B 30/02 | 392/461 |
| 8,768,154 B2 * | 7/2014 | Nakagawa | F24H 9/2028 | 392/485 |
| 8,971,694 B2 * | 3/2015 | Deivasigamani | G06F 16/9574 | 392/308 |
| 9,885,484 B2 * | 2/2018 | Young | F24D 19/1066 | |
| 10,378,830 B2 * | 8/2019 | Schierack | F28D 20/0039 | |
| 10,900,668 B2 * | 1/2021 | Callahan | F24H 9/2028 | |
| 2005/0005879 A1 * | 1/2005 | Houle | F28D 20/0034 | 122/14.31 |
| 2010/0290763 A1 * | 11/2010 | Boulay | F28D 20/0039 | 392/451 |
| 2012/0272927 A1 * | 11/2012 | Jonsson | F28D 20/0039 | 122/19.1 |
| 2015/0159886 A1 * | 6/2015 | Bush | F24H 4/04 | 392/308 |

* cited by examiner

INTELLIGENT HOT WATER HEATING SYSTEM WITH STRATIFIED TEMPERATURE-HEATING CONTROL STORAGE TANK

CROSS REFERENCE TO RELATED APPLICATIONS

This application claims the priority benefit of U.S. provisional patent application 62/645,400, filed Mar. 20, 2018; this application also claims the priority benefit of U.S. provisional application 62/674,846, filed May 22, 2018; the entire contents of these provisional patent applications are incorporated herein by reference.

BACKGROUND OF THE INVENTION

Field of the Invention

This invention is in the field of water heating devices and control systems

Description of the Related Art

Water heating systems are used to provide hot water for a wide range of applications. These applications include kitchen services, showers, washing and machines in residential buildings, food processing and dishwashing in restaurants. Heating and air conditioning systems also use hot water for space heating.

Commonly used methods to heat water include fossil fuel combustion (e.g. gas, oil), electric resistance heating, heat pump heating, and solar water heating. In addition to water heating components, such as different types of water heaters, boilers, and other types of hot water generators (all referred to here as water heaters), prior art water heating systems typically include other supporting equipment, such as storage tanks and control systems.

Some prior art water heating systems are also configured to recover and use waste heat from other processes. These can include recovering waste heat from shower drains, as well as waste heat released by refrigeration system condensers.

Some prior art water heating systems also incorporate more than one type of heating technologies. For example, water heating systems that are primarily based on solar energy, heat pump technology, or waste heat recovery technologies often also include backup electric and fossil fuel water heaters to ensure reliable hot water supply when solar energy or waste heat is not available or adequate or heat pump heating capacity cannot produce enough hot water to meet the demand.

BRIEF SUMMARY OF THE INVENTION

The invention is based, in part, on the insight that higher efficiency hot water heating systems can be devised that utilize, in addition to a water heater component (10), a heating-control storage tank (20) configured to hold hot water in a temperature stratified manner, control mechanisms (30), and suitable valves and temperature sensors configured to enable the controller dynamically change the flow of hot water and/or thermal energy between the water heater component and the heating-control storage tank depending upon patterns of hot water demand, the state of the system, and available energy sources.

The invention is also based, in part, on the insight that the heating load of the water heater can be modified by using a heating-control storage tank, as described herein, to achieve optimized operation. Such heating control-storage tanks can be used to shift the heating load timing from a time where the hot water is required to a time where heating energy is either cheaper or more available.

The invention is also based, in part on the insight that a heating-control storage tank, as described herein, can also be used to improve the efficiency of hot water heating systems. As will be discussed, such heating control storage tanks can also be used to create preferred input conditions (makeup water temperature and flow volume) to increase heating efficiency and reliability as well.

The invention is also based, in part, on the insight that both energy utilization time shifting and creating preferred input conditions to increase heating efficiency and reliability can be further facilitated by controlling the system according to a preset time schedule (schedule of operation mode). This schedule typically uses a controller or processor configured to anticipate both the users' normal hot water demand patterns (often as a function of time) and the various system performance characteristics.

The invention is also based, in part, on the insight that a stratified temperature heating-control storage tank (20), configured with at least a hot water outlet or hot water opening 21 (which can be configured as needed for water flow in either direction) on the hot water end of the tank (20), and configured with least a cold water inlet or cold water opening 22 (which can be configured, as needed, for water flow in either direction) on the cold water side of the tank (20) is particularly advantageous. This is because when sufficiently hot, and properly configured by the controller and suitable valves and/or pumps, the hot water side of the heating control storage tank can be used to directly supply hot water to end users (2), thus at least supplementing or extending any hot water also supplied by the water heater. The hot water end of the heating control storage tank can also be configured to at least temporarily store excess hot water produced by the hot water heater so that it is available when needed. In contrast to conventional systems, where water heating operation is largely determined by the user's hot water demand, this operating mode can be used to actively initiate water heating operation independent of the user's hot water demand, Note that the heating-control storage tank is also particularly useful for supplying hot water independently from the water heater. This allows for the hot water heater to be at least temporarily turned off or disconnected for energy efficiency purposes, yet the system will still be able to use the heating-control storage tank to instantly cope with random hot water demand from end users.

More specifically, and as will be discussed in more detail shortly, in some embodiments, the invention allows the operation of the hot water heater to be actively managed by the system, instead of by random hot water demand by end users. The invention's heating-control storage tank systems and methods allow the system controller to determine when the hot water is drawn from the water heater, and when the hot water is drawn from the heating-control storage tank, in order to enable the water heater to operate during times when energy prices are low, or the preferred energy source is available, or other preferred operating conditions exist.

As will be discussed, according to the invention, the system controller can also use the heating-control storage tank to determine how the hot water is drawn from the water heater as well. This enables the water heater to use the most efficient heating modes available. For example, for hybrid heat pump water heaters, the system control can be configured to avoid drawing hot water too quickly from the water heater, so that use of generally more expensive electric resistance type hot water heating methods can be minimized or avoided.

The system control can also be configured to avoid drawing small amounts of hot water from the hot water heater. Drawing small amounts of hot water is not always efficient, because this can lead to ineffective levels of heat exchange inside the hot water heater. Thus, in some embodiments, the system control can be configured to use a more optimal hot water draw rate to achieve more efficient water heating.

As reflected in the control flow diagrams, the controller can use a time-based operation mode schedule to determine how water heater is operated to implement the optimization strategy discussed above. Obviously, the operation mode schedule needs to be determined based on considerations of the expected time schedule of hot water demand from end users.

In some embodiments, when the heating-control storage tank is mostly filled with hot water, the temperature at the bottom of the tank will be significantly hotter than cold water supply. Often, under these conditions, the system controller may determine that the heating-control storage tank has enough water, and thus configure the system so that the heating control storage tank will be used to provide hot water directly to end users.

However, in some embodiments, when there is not enough hot water in the heating-control storage tank, the top (e.g. hot) side of the tank is may contain warm water that is not hot enough to be supplied to end users, and the bottom (e.g. cold) side of the heating-control storage tank may be cold—the same temperature as the cold water supply. In this situation, the invention may be configured so that water from the hot end of the heating-control storage tank is sent to the water heater (10) as makeup water. The benefit of this type of operation mode includes the following:

1: Allows the water heater to produce hot water quickly to meet large demand.

2: Allows less energy to be used, when energy cost is high or less available.

3: Allows the heating-control storage tank to be completely filled with cold water so that the heating-control storage tank will later have a full capacity to store hot water during the next time period when energy prices are low or other preferred operating conditions exist.

In some embodiments, the system may employ one or more circulation pumps that are turned on to fill the heating-control storage tank with hot water. The system can also be configured so that water from the inlet of the heating-control storage tank is sent to the inlet of the water heater as makeup water. In this type of situation, although the system can function adequately when the temperature at the bottom of the heating-control storage tank is warm, it actually may be more efficient if the system controller has configured the system so that the temperature at the bottom of the heating control storage tank is cold. This is because in some configurations, the hot water heater efficiency may be higher when the makeup water is cold, due to more effective heat transfer from the heating source to the water.

Although, as the heating-control storage tank is filled with more hot water, the bottom (cold side) of the heating-control storage tank will generally become filled with warmer water, the system controller may be configured to balance the competing issues of a) it generally takes less energy to heat warm water to the target temperature, but b) the hot water heater may operate with lower efficiency if it uses warm temperature makeup water from the bottom of the heating control storage tank. The system controller software can be configured to balance these various factors and pick a solution that attempts to optimize hot water availability with the lowest energy costs.

Note that in some embodiments, the invention may use one port for circulating hot water into the heating-control storage tank, and another port to supply hot water from the heating-control storage tank. In these alternative embodiments, both ports may be on the warm side of the tank. In some embodiments, the invention may use a plurality of ports for circulating hot water into the heating-control storage tank, and a different plurality of ports to supply hot water from the heating-control storage tank. Thus, in general, when "a" port or inlet or outlet is discussed, it should generally be interpreted to mean "at least one" port or inlet or outlet.

The "cold" end of the heating-control storage tank can also have multiple uses. Typically, although colder than the hot water side, the "cold" water side (22) of the stratified temperature heating control storage tank (20) will, at least due to proximity to the hot water, will usually be significantly hotter than the water from any cold supply water (1) supplying the system.

Thus, the controller, and suitable valves and/or pumps can also be configured to, as demand and operating conditions warrant, either receive very cold water directly from the cold-water supply (1), or provide at least the warmer water from the heating-control storage tank to the water heater (10) as "makeup water". This warmer "makeup water" can be taken from either the cold or hot end of the heating-control storage tank. If "warmish but not cold" water is taken from the hot end of the stratified heating control storage tank, this may allow the hot water heater (10) to more quickly, and with less energy, heat the warmer (above the ambient temperature of the cold-water supply) makeup water to the desired hot water temperature.

In alternative embodiments, the invention may be a hot water heating system configured to minimize energy costs by dividing at least some of the functions of hot water heating and hot water storage between a water heater (which may or may not have its own water heater tank) with at least one water heating mechanism, and a heating-control storage tank generally configured to store water in a temperature stratified manner where hotter water tends to be separated from cold water. The system is electronically controlled using a processor, various sensors, electronically actuated valves and, in some embodiments, an optional recirculation pump. In some embodiments, depending on hot water needs and energy costs, the system can supply hot water from the water heater (with an optional water heater tank), the heating-control storage tank, or both of them. In some embodiments, the system may fill or otherwise heat the water in the heating-control storage tank by exchanging thermal energy between the water heater and the heating-control storage tank. In general, the invention will manage the various water heating mechanisms, in a manner that modulates the amount of hot water in the heating-storage tank in a manner that optimizes the availability of hot water while minimizing energy costs.

More specifically, in some embodiments, the invention may be a hot water heating system. This system will often comprise a water heater (with an optional water heater tank) with a water heater inlet, outlet, and, if a water heater tank is present, a first water volume capacity configured to use at least one electronically controlled energy source to heat water. As will be discussed, in some embodiments, more than one type of energy source may be used here. Components of the water heater may be assembled into a package or installed as separated pieces with necessary mechanical and electric connections among them.

The system will also comprise at least one heating-control storage tank. This heating-control storage tank will typically have at least one heating-control storage tank inlet and at least one outlet. The heating-control storage tank will typically have a second water volume capacity configured to store water in a stratified configuration where warmer water is separated from colder water. Typically, the warmer water portion of this tank (often on the top) will be associated with the at least one heating-control storage tank outlet, and the colder water portion of this tank (often on the bottom) will be associated with the at least one heating-control storage tank inlet.

This water heater (and optional water heater tank) and the heating-control storage tank are typically connected to a cold-water supply. The system uses pipes and electronically actuated valves to control the flow of cold water into both the water heater inlet and the heating-control storage tank inlet. The water heater and the heating-control storage tank are typically further coupled with suitable pipes and electronically actuated valves to a hot water supply pipe so that hot water for the end user can be supplied by any combination of the water heater outlet and the heating-control storage tank outlet. Additionally, the water heater and the heating-control storage tank are typically further configured with suitable pipes and electronically actuated valves to enable the water heater inlet to receive water from the heating-control storage tank outlet as makeup water (makeup water is water which is added to compensate for losses, such as compensating for the loss of water when water is removed from a storage tank). This can be warm or hot water depending on the operational mode of the system.

The system may also include suitable pipe connections, electronically actuated valves, and additional components such as electronically controlled water pumps (to be discussed later) to transfer thermal energy from the water heater to the heating-control storage tank. This can be achieved in several ways depending on configurations of the water heater. In some embodiments, such as the first embodiment shown in FIG. 1A, the system may use suitable pipe connections and an electronically controlled water pump to enable water recirculation between the water heater and the heating-control storage tank. The water recirculation sends hot water generated by the water heater to the heating-control storage tank and takes water with a lower temperature in the heating-control storage tank to the water heater. Pipe connections for water recirculation may be achieved by connecting the water heater outlet to the heating-control storage tank outlet and the water heater inlet to the heating-control storage tank inlet. The electronically controlled water pump may be installed in either of the two pipe connections. Note that, in this configuration, hot water from the water heater is put into the warm side of the heating-control storage tank and water from the cold side of the heating-control storage tank is put into the water heater. Alternatively, the water heater and/or the heating-control storage tank may have additional inlets and/or outlets that are used to establish pipe connections for water recirculation.

In some embodiments, such as the second embodiment shown in FIG. 1B, the system uses a heating fluid (which may or may not be water) heated by the water heater (10) and water heater heat exchanger (14) to heat water in the heating-control storage tank by way of a heating control storage tank heat exchanger (23). With suitable pipe connections, electronically actuated valves, and optional electronically controlled pump, the system circulates heating fluid from the water heater heat exchanger (14) to the heat exchanger (23) inside or connected to the heating-control storage tank (20) and back to the water heater (10) again. Thus, the same heating fluid may also be used to at least help generate hot water in the water heater.

The system may use an electronically controlled valve to control the heating fluid flow and to configure the heating fluid for either heating water in the water heater (10) or heating water in the heating-control storage tank (20). When the water heater (10) includes a heat pump water heater, the system may use, for example, a high-temperature refrigerant (such as 1,1,1,2-tetrafluoroethane, a mixture of difluoromethane and pentafluoroethane (such as R-410a), ammonia, carbon dioxide and the like) received as the output from a heat pump compressor as a heating fluid. The heat pump compressor increases the pressure of the refrigerant to force it to flow to the heat exchanger and back to the heat pump evaporator.

Additionally, or alternatively, the system may use hot water generated by the water heater as a heating fluid and use an electronically controlled water pump to send the hot water to a heat exchanger (23) used to heat water in the heating-control storage tank.

In some embodiments, such as the third embodiment shown in FIG. 1C, the system uses an electronically controlled water pump to circulate water in the heating-control storage tank through a heat exchanger (14) in the water heater (10) to receive thermal energy provided by the water heater. The system may enable this water circulation by, for example, connecting the water from the warm side of the heating-control storage tank (20) and water from the cold side of the heating-control storage tank into the heat exchanger (14) in the water heater (10). To do this, the system may use other ports on the heating-control storage tank (20) to establish various pipe connections to enable this type of water circulation. The heat exchanger (14) in the water heater (10) may alternatively also be used to heat water in the water heater (10). The system may use electronically actuated valves and/or pumps to determine if any water in the water heater (10) or the heating-control storage tank (20) is allowed to enter the heat exchanger (14) to be heated.

The system will typically further comprise a system controller and a plurality of sensors, such as temperature sensors and optionally also water flow sensors. The system controller will typically be configured to control the various electronically actuated valves and electronically controlled heat sources, such as turning on or off a heat pump or electronic resistance heaters, so as to manage the amount of hot water in the heating control-storage tank. This, in turn, determines the water heating schedule and helps the system minimize energy costs while providing a reliable hot water supply.

DETAILED DESCRIPTION OF THE INVENTION

Figure 1A:
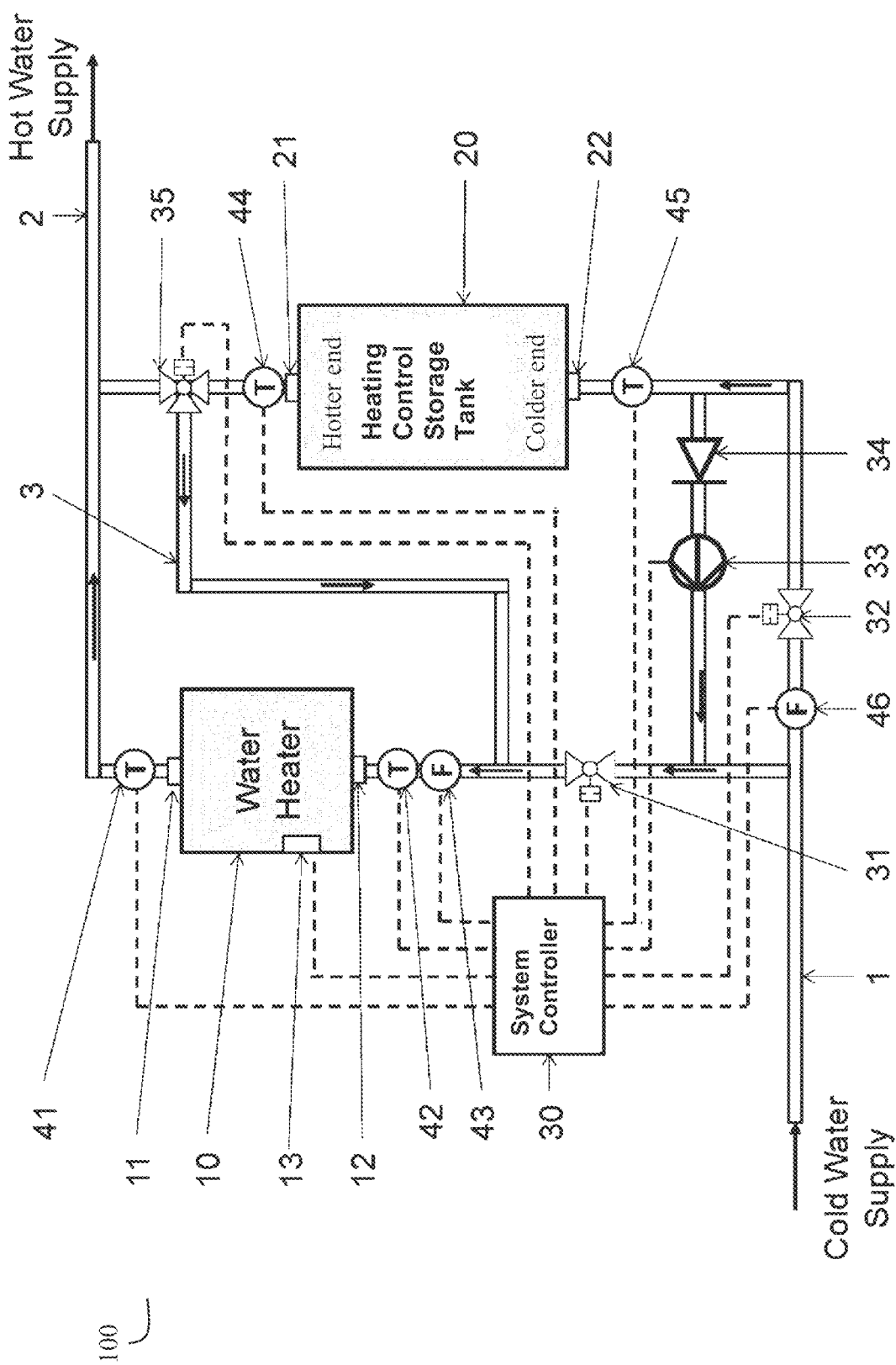
FIG. 1A illustrates a first main embodiment of a water heater system in accordance with the first set of embodiments of the present disclosure.

The invention is based, in part, on insights obtained by generalizing and extending certain concepts from hybrid water heating and control systems.

Different methods of heating water have different installation costs, operating costs and energy efficiency. For example, although heat-pump based water heaters cost considerably more to install, heat-pump based water heaters have cheaper operating costs and are considerably more energy efficient than electric resistance type water heating technology. As a result, heat-pump based water heating systems often include both a heat pump water heater with more limited water heating capacity, as well as electric resistance heaters that have a larger heating capacity. This combination thus forms a hybrid electric water heating system that has a reasonable installation cost and operating cost, as well as an adequate heating capacity.

Control methods: The invention is also based, in part, on insights obtained by generalizing and extending certain water heating control concepts.

Nearly all water heaters have at least some limited form of control technology, and as the water heating system grows in complexity, control methods can be used to further optimize performance and efficiency. In particular, water heating systems that use multiple water heating technologies can greatly benefit from more sophisticated control methods.

For hybrid heat-pump/electric-heating water heating systems, control systems configured to maximize the use of the more energy efficient heat pump portion, and minimize the use of the less energy efficient electric resistance heating portion, can significantly reduce overall operating electricity consumption.

Similarly, for hybrid water heating systems that combine more energy efficient solar water heating and/or heat recovery technologies with less efficient backup water heating methods, the control system should ideally use solar energy or waste heat whenever it is available, and only use the less efficient backup (such as fossil fuel or electrical heating backup heaters) water heaters when solar or waste heat is unavailable.

Timing considerations: Although not 100% predictable, hot water use often follows a repeated daily or weekly demand pattern, which is when the users will demand that certain quantities of hot water are available at various amounts and temperatures. At the same time, the cost of energy to produce hot water will also often follow a daily or weekly pattern. For example, electrical energy costs from common utility electrical energy grids are often higher at peak times during the weekday, and generally, are lower at nights and weekends.

Thus, so long as this is compatible with the demand pattern of hot water use, energy costs can be reduced by scheduling the water heating operation to times when the price of energy is low. Heat pump and electric resistance water heaters, in particular, should be controlled in a manner that tries to avoid water heating operation during peak (high electrical energy cost) hours.

Water heaters based on renewable energy, such as solar and wind electricity, which also have electrical heating elements (heat pumps, electrical resistance heating) that draw energy from an electrical grid, can have even more complex control and scheduling considerations. Thus, in addition to the demand pattern of use, an optimum heating schedule will also consider the times when renewable energy is available, and the times when electrical energy costs from the grid are lower.

In prior art water heating equipment and systems, water heating operation is mostly determined by the pattern of user hot water demand. The invention is based, in part, on the insight that such prior art methods limit the extent to which the water heating operation can be adjusted for the purpose of improving system efficiency, reducing energy cost, or enhancing renewable energy utilization.

For prior art water heating equipment and systems without hot water storage, water heating operation is generally activated whenever there is user hot water demand and is generally terminated whenever the user hot water demand ends. As a result, in the prior art systems, the water heating operation is incomplete, or near complete, synchronization with the pattern of user hot water demand.

For prior art water heating equipment and systems with hot water storage, these systems still operate at less than ideal efficiency.

For example, for storage type water heaters, the water temperature in the storage tank typically needs to be maintained at a target level (or temperature setpoint), in order to provide a stable hot water supply. Thus, in prior art systems, when the hot water is drawn from the hot water storage tank to meet this user demand, cold makeup water is typically introduced into the hot water storage tank, and this cold water reduces the water temperature in the hot water storage tank.

Once the water temperature in the hot water storage tank drops below a certain temperature threshold, the prior art water heater control system activates the water heaters, which heat the water in the tank to a previously determined temperature setpoint.

Prior art water heating systems that have dedicated hot water storage tanks that are separated from the water heating part of the system (water heating equipment) typically operate in a similar manner. In these systems, the dedicated storage tank(s) are typically used to provide hot water to meet user demand. The separate water heating equipment, which may or may not have its own integrated hot water storage compartment, is typically used to maintain the water temperature in the dedicated storage tanks to previously determined temperature setpoint as well.

Thus, in these prior art systems with dedicated hot water storage tanks separated from the heating part of the system, when the user demands hot water, hot water flows out of the dedicated hot water storage tank, and cold water comes in. This results in a decrease in the temperature of the water in the dedicated hot water storage tanks. This, in turn, will trigger the separate water heating equipment into operation in order to keep the water temperature in the dedicated storage tank at its determined temperature setpoint.

The invention is based, in part, on the insight that in this type of prior art water heating systems, the dedicated hot water storage tanks act as a buffer that prevents the system from responding quickly to this user demand. That is, there is a time delay between the time that the user demands hot water from the system, and the time that the hot water system's control units turn on the heating part of the system.

This time delay increases as the storage capacity of the dedicated hot water storage tanks increases. Due to this buffering effect, a small amount of user hot water demand may not cause enough temperature drop in the dedicated hot water storage tanks to immediately trigger the separate water heating equipment into operation.

Another source of inefficiency with prior art designs is that hot water storage tank insulation is never perfect. Even when there is no user demand, the dedicated hot water storage tanks will still continuously lose heat over time. This heat loss causes a slow reduction in the temperature of the water in the dedicated hot water storage tanks. Eventually, the continuous heat loss will cause the hot water temperature to drop past a setpoint, triggering the separate water heating equipment to reheat the water.

Some prior art water heating systems employ temperature modulation control. This type of control changes the temperature setpoint between the time periods when the system anticipates that hot water is not desired (such as the nighttime), and the time period when the system anticipates that hot water will be desired (such as during the day). This enables the dedicated hot water storage tanks to increase the amount of stored thermal energy, and hence buffering capacity, depending upon anticipated times when more hot water will be required. For example, during times, such as in the morning, when the system anticipates that a significant amount of hot water will be needed, the system can set the temperature setpoint at a higher temperature before the anticipated morning surge of use so that there would be enough hot water to meet the demand.

By contrast, during the time period when the control system anticipates that water heating operation will probably not be desired, such as during the nighttime, the control system can lower the temperature setpoint to a normal, or even slightly subnormal setting so that the rate of heat losses due to imperfect hot water storage tank insulation is relatively low during times of expected low hot water demand. This helps improve overall efficiency, but of course, if there is an unexpected demand for hot water, the system may not function adequately.

This control strategy of increasing and decreasing the temperature setpoint depending on times of expected user hot water demand has other problems as well. The temperature setpoint cannot be set too high. This is because water heating efficiency decreases at higher temperature setpoints. Additionally, particularly for domestic hot water applications, hot water with excessively high temperatures is considered to be unsafe because it is a scalding hazard.

Overly high-temperature water can be tempered (brought down to a lower temperature) by using a tempering process to mix the high-temperature water with cold water, thus creating a lower temperature "safe" hot water that can then be delivered to the end user. However, this still does not resolve the safety problems, because if the tempering process fails, scalding hot water can still be delivered to end users. Thus, for safety reasons, higher temperature setpoints are typically not recommended, and in some cases can even be prohibited. So, the effectiveness of this type of anticipated use or time-temperature modulation control setpoint scheme is limited.

The present invention is based, in part, on the above analysis of the deficiencies of prior art hot water heating systems.

An overview of a first main embodiment of the present invention is shown in FIG. 1A.

The first embodiment of the present invention (100) comprises a water heating system and method with at least one water heater (10), at least one water storage tank (20) (heating-control storage tank) that is not part of the water heater (10), and a system controller (30). This system controller (30) can be a computer processor-based system control, but the control functionality can also be implemented by other methods as well. The invention further comprises various temperature sensors, valves, and other components discussed below.

The storage tank (20) is used to help control the water heating operation and, therefore is referred to as the heating-control storage tank hereafter to differentiate it from any other storage tanks in the water heating system. In some embodiments, the heating-control storage tank (20) may be combined with its own water heating equipment, e.g. a heat exchanger and an electric resistance heating element, to have the heating-control storage tank (20) its own ability to heat water, while still be used to control water heating operation of other water heaters in the water heating system. However, for simplicity, in most of the discussion of this first embodiment here, the heating-control storage tank is assumed to not have its own independent water heating equipment. Note, however, that in the second embodiment, which will be discussed shortly, the heating-control storage tank can include a heat exchanger to receive a heating fluid from the water heater.

Returning to the discussion of the first embodiment, the water heater (10) may optionally also include its own water storage tank, but the optional water heater tank is not used in the same way as a heating-control storage tank (20), as discussed below. For example, in some embodiments, such as home hot water heating use, the water heater (10) tank, if present, may be configured to store between 40 to 60 gallons of water, while the heating control storage tank may be configured to store between 30-80 gallons of water.

In some embodiments, the water heater (10) may also have its own control system (13) that automatically turns on a water heating operation after sensing when cold water is flowing into the water heater. In these cases, some of the heating control functions of the system controller (30) may be taken over by the water heater's own control system (13). However, for simplicity, we will often ignore (13), and focus primarily on the system controller (30).

The system controller (30) schedules water heating operation by controlling water flow configuration within the water heating system, often using various electrically actuated water valves. In some embodiments, the system controller (30) can also control the operation of the water heater (10). If the heating-control storage tank (20) has its own water heating equipment, the system controller (30) can also control the operation of the water heating equipment in the heating-control storage tank (20).

All components in the invention's water heating system may be assembled as either in one packaged unit or alternatively as various separated pieces.

Both the water heater (10) and the heating-control storage tank (20) are connected to both the main cold-water supply pipe (1) in the facility where they are installed, as well as the main hot-water supply pipe (2) that goes to end users.

According to the invention, both the water heater (10) and the heating control storage tank (20) are configured with suitable pipes and system controller adjustable valves (such as electrically controlled water valves) so that both the water heater (10) and the heating control storage tank (20) can be used, at least upon proper commands from system controller (30), to independently or simultaneously supply hot water to the end users.

For both the water heater (10) and the heating-control storage tank (20), automatically controllable valves (such as 31 and 32) can be installed on either the pipe connected to the cold-water inlet (1) or the pipe connected the hot-water outlet (2). These valves can be shut-off valves or flow-control valves.

These valves are occasionally called the "controllable valve for the water heater" (31) and the "controllable valve for heating-control storage tank" (32), respectively. By using the system controller (30) to control the extent of opening of these valves, the system controller (30) can determine if the water heater (10), the heating-control storage tank (20), or both are used to supply hot water to end users (or end uses).

In some embodiments, water in the heating-control storage tank (20) is stratified. That is, tank (20) is configured so that hotter water stays in the top portion of the tank and colder water stays in the bottom portion of the tank. Here, the heating-control tank may be configured as a tall cylinder with a relatively small radius compared to the height, or with various internal baffles, to help maintain this stratification. For example, the heating-control storage tank may have a diameter of 20 inches and a height of 42 inches and may be oriented with the top part of the cylinder mounted towards the ceiling, and the bottom of the cylinder mounted towards the floor, in order to achieve this stratification. Various internal structures, such as baffles, may also be used to help achieve greater temperature stratification. This is discussed in more detail in FIG. 1D. Alternatively, the heating-control tank may be configured as a series of smaller tanks connected by water conducting pipes in series, as is shown in more detail in FIG. 1E.

In a preferred embodiment, hot-water (21) is connected to the top portion of the heating-control storage tank (20) and cold-water inlet (22) is connected to the bottom portion of the heating-control storage tank (20).

Although only one heating-control storage tank (20) is shown in FIG. 1, in some alternative embodiments, multiple heating-control storage tanks may be used. In a preferred embodiment, when the system employs multiple heating-control storage tanks (20), these heating-control storage tanks are preferably connected in series to form a combined (larger) storage heating-control storage tank. In this series configuration, the hot-water outlet (21) of the first heating-control storage tank is connected to the main hot-water supply pipe (2), and the cold-water inlet (22) of the first heating-control storage tank is connected to the hot-water outlet (21) of a second heating-control storage tank. This can be repeated as desired. Finally, the cold-water inlet (22) of the last tank in this series is typically connected to the main cold-water supply pipe (1).

One or more controllable water valve can be also installed at any location in this path of connections so that controlling the extent of opening of these valves determines water flow through these tanks.

Regarding Certain Aspects that are Specific to the First Embodiment of the Invention Returning to the first embodiment configuration shown in FIG. 1A, the hot-water outlet (11) of the water heater (10) is connected (usually with water pipes and also with controllable valves, to be discussed) to the hot-water outlet (21) of the heating-control storage tank (20); and the cold-water inlet (22) of the heating-control storage tank (20) is connected to the cold-water inlet (12) of the water heater (10).

These pipe connections configure the water heater (10) and the heating-control storage tank (20) to form a water circulation loop. To facilitate water circulation, a circulation pump (33), configured to be automatically controlled by the system controller (30), can be installed on the pipe in this loop. A check valve (34) can be installed on the pipe, where the circulation pump (33) is installed, to only allow water flows in the same direction as that generated by the circulation pump (33).

When system controller (30) turns on the circulation pump, and the respective valves are configured to permit this, hot water flows from the hot-water outlet (11) of the water heater (10) to the hot-water outlet (21) of the heating-control storage tank (20). At the same time, water with lower temperature flows from the cold-water inlet (22) of the heating-control storage tank (20) to the cold-water inlet (12) of the water heater (10). The system thus uses this water circulation to fill the heating-control storage tank (20) with hot water coming out of the water heater (10); and at the same time, the system sends water with a lower temperature (lower temperature water) from the heating-control storage tank (20) into the water heater (10).

After receiving enough lower temperature water from heating control storage tank (20), the water heater (10), either with its own built-in control (13) or as commanded by the system controller (30) starts water heating operations to bring the water temperature to a temperature setpoint (e.g. the desired temperature).

Other variations on the above configurations are also possible, and the second and third embodiments of the invention, to be discussed shortly, will discuss some alternative configurations.

In most embodiments, including the first, second, and third embodiments, of the invention, the hot-water outlet (21) of the heating-control storage tank (20) is also connected to the cold-water inlet (12) of the water heater through a water pipe (#3). An automatically controllable three-way valve (35) can be used to control this. The system controller (30) can set valve (35) so that water coming out of the hot-water outlet (21) of the heating-control storage tank (20) flows to either the hot water supply pipe (2) or to the cold-water inlet (12) of the water heater (10).

Other schemes to control water flow are also possible, however. In some embodiments, instead of using a three-way valve (35), the system may alternatively use two electrically controlled valves to achieve the same function.

In other embodiments, the outlet of the heating-control storage tank (20) may be connected to the hot water supply (2), but not connected to the cold-water inlet of the water heater (1, 12).

In some embodiments, the outlet of the heating-control storage tank (20) may only be connected to the cold-water inlet (12) of the water heater (10), and not directly to the hot water supply pipe (2). In these embodiments, when the water heater (10) receives hot water from the heating-control storage tank (20) as the makeup water, no heating operation is triggered. Instead, the effect is the same as having the heating-control storage tank (20) provide hot water directly to the hot water supply pipe (2), and the water heater (10) is simply a conduit for this hot water.

When the system controller (30) determines that the heating-control storage tank (20) has adequate hot water, the system controller (30) can then close the controllable valve (31) connected to water heater (10), and open the controllable valve (32) for the heating-control storage tank (20). The system controller (30) can then command the three-way valve (35) to let hot water coming out of the heating-control storage tank (20) flow into the hot water supply pipe (#2). In this flow configuration, the heating-control storage tank (20) is used to provide hot water to meet user demands.

When the system controller (30) determines that the temperature of the water in the heating control storage tank (20) is too low (e.g. the heating-control storage tank only has warm water, which is not hot enough to provide satisfactory hot water services), the system controller (30) can configure the system to use the warm water in the heating control storage tank (20) as the makeup water to the water heater (10), rather than just using cold water (1).

As a result, water heater (10) only has to heat the warm water from (20), rather than the cold water from (1). Thus, the heating load (energy requirements) of the water heater (10) will be less when using warm water from (20), rather than cold water from (1), as makeup water. This operation can reduce energy consumption when energy price is high or renewable energy is not available. Also, by reducing or depleting warm water in the heating-control storage tank, heat loss due to imperfect hot water storage tank insulation can be reduced or eliminated.

To configure the system for this type of operation, system controller (30) can command water heater (10) controllable valve (31) to close, and command heating-control storage tank (20) controllable valve (32) to open, allowing cold water (1) to enter the lower (colder) part of the stratified heating-control storage tank (20). The system controller (30) can also command a valve, such as a three-way valve (35) to let warm water coming out of the top part (21) of the stratified heating-control storage tank (20) to flow into the cold-water inlet (12) of the water heater (10). In this particular flow configuration, the water heater (10) is used to supply hot water to meet user demand (2) while using warm water from the heating-control storage tank (20), instead of cold water (1), as makeup water for the water heater (10).

In some embodiments, the controllable valve for the water heater (31) and/or the controllable valve for heating-control storage tank (32) may have flow-control capabilities. The system controller (30) can, for example, configure the system to mix the water from the water heater (31) and the heating-control storage tank (32) to reach a target temperature before being delivered to end users (or end uses).

To configure the system for this type of operation, system controller (30) can command both water heater (10) controllable valve (31) and heating-control storage tank (20) controllable valve (32) to open, allowing cold water (1) to enter both the water heater (10) and the heating-control storage tank (20). The system controller (30) can also command the three-way valve (35) to let hot water, coming out of the heating-control storage tank (20), flow into the hot water supply pipe (#2). The system controller (30) can then also adjust amount of water flowing through water heater (10) controllable valve (31), heating-control storage tank (20) controllable valve (32), or both of them in order to ensure that the temperature of the mixed water, as measured by the temperature sensor (47), reaches a target level.

This type of operation is useful when temperature modulation control directs the water heater (10) to increase its hot water temperature to a temperature that is above the level normally considered to be safe for end users.

In this case, system control (30) will first use the heating-control storage tank (20) to supply hot water by commanding water heater (10) controllable valve (31) to close, and heating-control storage tank (20) controllable valve (32) to open. Once the heating-control storage tank (20) output temperature, as measured by the temperature sensor (44) installed at the outlet (21) of the heating-control storage tank (20), is not hot enough to provide satisfactory service, the system control (30) can command the water heater (10) controllable valve (31) to open (or open further) in order to let water heater (10) to also supply hot water. The system control (30) can further adjust the water flow through the water heater (10) controllable valve (31), so that the temperature of the mixed hot water, as measured by the temperature sensor (47) installed on the hot-water supply pipe, reaches the desired level in order to provide satisfactory hot water services.

This type of operation can also be used when temperature modulation control is applied to the heating-control storage tank (20). Here assume that heating-control storage tank (20) is equipped with heating equipment, and this heating equipment has been directed to increase tank (20) hot water temperature to above the level normally considered to be safe for end users.

In this case, system control (30) will first use the water heater (10) to supply hot water by commanding the water heater (10) controllable valve (31) to open, and the heating-control storage tank (20) controllable valve (32) to close. Once the water heater (10) output temperature, as measured by the temperature sensor (41) installed at the outlet (11) of the water heater (10), is determined to be not hot enough to provide satisfactory hot water service; then the system control (30) can command the heating-control storage tank (20) controllable valve (32) to open to also let the heating-control storage tank (20) to supply hot water.

The system control (30) can further adjust the water flow through the heating-control storage tank (20) controllable valve (32), so that the temperature of the mixed hot water, as measured by the temperature sensor (47) installed on the hot-water supply pipe, reaches a proper level for satisfactory hot water services.

Thus, by suitable commands to the system's circulation plump (33), and various flow-control valves such as (31, 32, 35), the system controller (30) can set the invention's improved hot water heating system to operate in five main operation modes:

(1) Configure the water heater (10) to meet hot water demand by itself, and isolate the heating-control storage tank (20) from hot water demand.

(2) Configure heating-control storage tank (20) to meet hot water demand by itself, and enable the water heater (10) to avoid water heating operation.

(3) In the first embodiment of the invention (e.g. FIG. 1A), also configure the water heater (10) to fill the heating-control storage tank (20) with hot water and activate water heating operation. Note that step (3) is not applicable to the second and third embodiments of the invention, to be discussed shortly.

(4) Configure the water heater (10) to meet hot water demand, while using warm water from the heating-control storage tank (20) as makeup water (i.e. in place of cold water), thus minimizing or avoiding water heating operating and minimizing energy use.

(5) Configure both the water heater (10) and the heating-control storage tank (20) to meet hot water demand, and also adjust the water from the water heater (10), or the heating-control storage tank (20), to make the mixed hot water reach a target temperature level.

A second and third main embodiment of the invention is discussed below that uses heat exchangers. As will be discussed in more detail, these two additional embodiments differ according to where and how the water is heated, and the placement of the heat exchanger. Generally, the water can be heated in either the heating-control storage tank or in the water heater.

In the second main embodiment, the water in the heating-control storage tank is heated by a heating fluid (which may or may not be an aqueous heating fluid) that flows into and through a heat exchanger that is located in the heating-control storage tank.

In the third main embodiment, the heat exchanger is located outside the heating-control storage tank. In this embodiment, the heat exchanger may either be located in the water heater (preferred embodiment), or in some other location. In this third embodiment, water in the heating-control storage tank is heated by pumping the heating-control storage tank water through the heat exchanger located outside the heating-control storage tank.

Figure 1B:
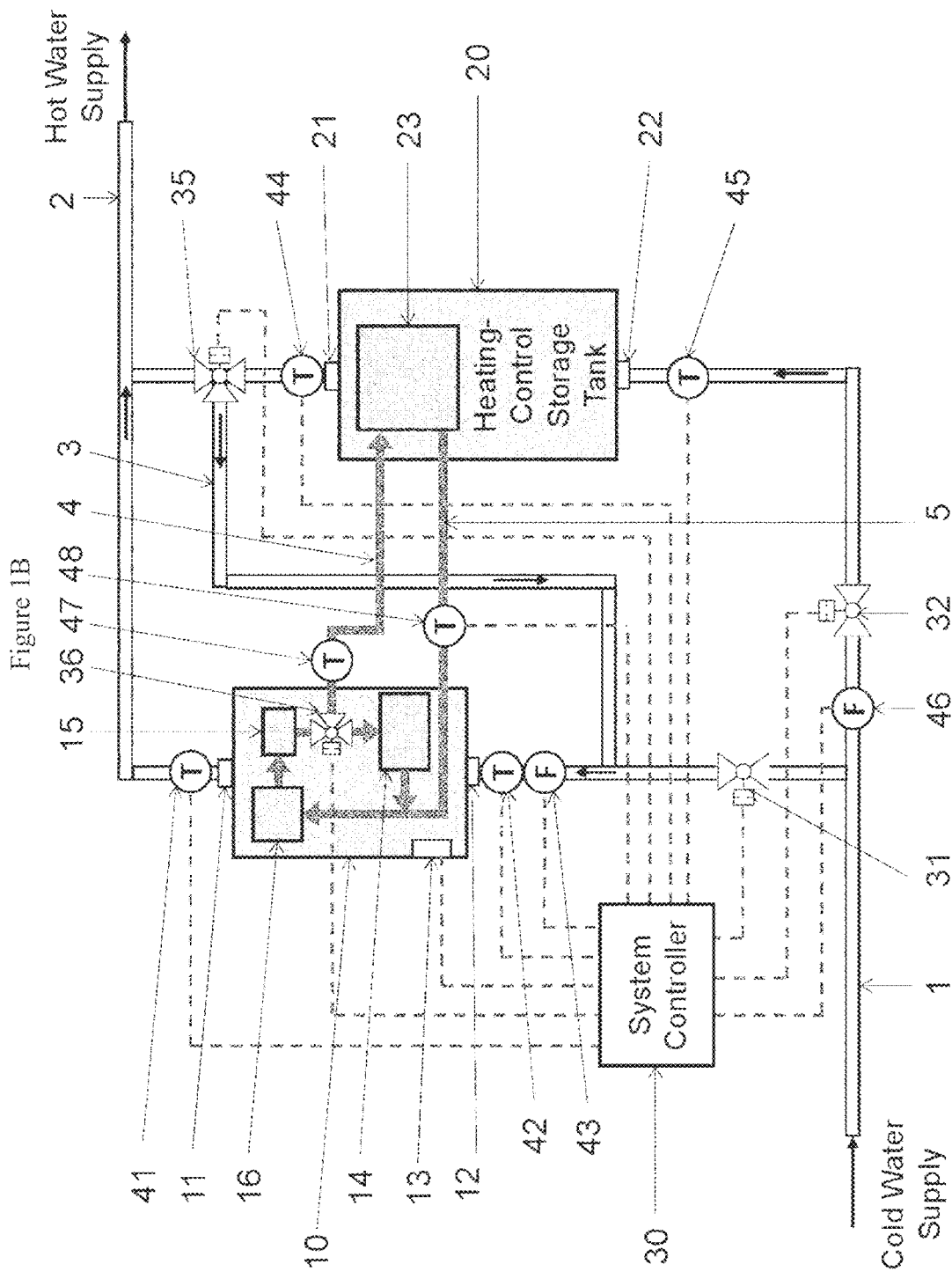
FIG. 1B illustrates a second main embodiment of a water heater system in accordance with the second set of embodiments of the present disclosure.

Regarding the Second Main Embodiment of the Invention—Heat Exchanger in Heating-Control Storage Tank Description of the Second Main Embodiment of the Invention:

In this second main embodiment of the invention, which is shown in FIG. 1B, the water heater (10) includes a heat pump water heater, which uses a compressor (15) to increase the pressure and temperature of working fluid which may be either an aqueous heating fluid such as water, or a non-aqueous heating fluid such as R134a and carbon dioxide, here used as a non-aqueous heating fluid.

(Note that in some less preferred embodiments, instead of a heating fluid, a heating gaseous media, such as steam, may be used to transfer thermal energy. In such less-preferred embodiments, the water heater may employ a steam generator.)

The system uses an electrically controlled three-way valve (36) to send the high-pressure and high-temperature heating fluid to the heat exchanger (23) located in the heating-control storage tank (20), thus transmitting thermal energy between the water heater and the heating-control storage tank (20). The system may configure the electrically controlled three-way valve (36) to allow the high-pressure and high-temperature heating fluid to flow to the heater exchanger (14) in the water heater (10). In either heat exchanger, water is heated while the heating fluid is cooled and condensed from gas phase to liquid phase. The two heat exchangers work as a condenser for the heat pump process. The condensed heating fluid, from either the two heat exchangers, flows to an evaporator (16), which allows the liquefied heating fluid to be evaporated into a gas phase by absorbing thermal energy from a heat source, for example surrounding air or water from other equipment.

The system controller (30) can control the operation of heat pump compressor (15) and heat pump three-way valve (36) directly or through the water heater built-in control (13), if it exists, by sending control signals to it. If the water heater does not have a built-in controller, the system controller (30) controls the operation of the water heater and electrically actuated valves installed on water pipes connected to the water heater (10) and heating-control storage tank (20).

After activating water heating in the heating-control storage tank (20), the system controller (30) monitors the temperature of the heating fluid flowing into and out of the heat exchanger (23) using two temperature sensors (47 and 48). As water in the heating-control storage tank (20) is heated, the temperature difference between the heating fluid flowing into and out of the heat exchanger (23) becomes small. The system controller (30) calculates the temperature difference using measurements from the two temperature sensors (47 and 48). Once the temperature difference becomes small enough, the system controller (30) may turn off the heat pump compressor (15) and set the heat pump three-way valve (36) to enable heating fluid to flow into the heat exchanger (14) in the water heater (10).

Operation Mode:

The system can activate heating operation to heat water inside the heating-control storage tank (20) by turning on the heat pump compressor (15) and directing the high-temperature heating fluid into the heat exchanger (23) in the heating-control storage tank (20).

The System's Operation Status is Reflected by the Following Key Parameters:

The system controller (30) commands that heat pump compressor (15) be turned on and high-temperature heating fluid to flow into the heat exchanger (23) in the heating-control storage tank (20).

Control:

In this embodiment, the operation control specifications can include when and for how long the heat pump compressor (15) is turned on.

In terms of the adjustments to system operation, in this second embodiment, the system controller (30) helps ensure that utilization of heating fluid by the water heater (10) and the heating-control storage tank (20) is coordinated. In general, the system controller (30) may ensure that the water heater (10) has the priority to use the heating fluid because the water heater (10) is the primary source of hot water supply to end users. When the water heater (10) does not have a built-in controller, the system controller (30) directly controls the heat pump compressor (15) and heat pump three-way valve (36). The system controller (30) may activate water heating in the heating-controlling storage tank (20) only when there is no heating demand from the water heater (10). When the water heater (10) has a built-in controller to control heat pump compressor (15), the system controller (30) may send control signals to the water heater built-in controller (13) to request for water heating in the heating-controlling storage tank (20). The water heater built-in controller (13) may turn on the heat pump compressor

(15) and adjust the heat pump three-way valve (36) if there is no water heating operation in the water heater (10). Once there is water heating demand in the water heater, the water heater built-in controller (13) may adjust the heat pump three-way valve (36) to direct heating fluid to flow into the water heater heat exchanger (14).

When the heat pump compressor (15) is turned on to provide heating fluid to heat water in the heating-control storage tank (20), the system controller (30) monitors the heating status by measuring the temperatures of heating fluid flowing into and out of the heat exchanger (23) using temperature sensors (47 and 48). As the water temperature in the heating-control storage tank (20) increases, heat transfer from the heating fluid to water slows down so that the temperature difference between the heating fluid flowing into and out of the heat exchanger (23) becomes smaller. The system controller (30) may use heat transfer principles to estimate average water temperature in the heating-control storage tank (20) based on temperature measured by the two temperature sensors (47 and 48), along with physical properties of heating fluid, design characteristics of the heat exchanger (23) and heat pump compressor (15). Once the estimated average water temperature in the heating-control storage tank (20) exceeds a threshold, specified in control settings, the system controller (30) may turn off the heat pump compressor (15) and set the heat pump three-way valve (36) to enable heating fluid to flow into the heat exchanger (14) in the water heater (10).

Figure 1C:
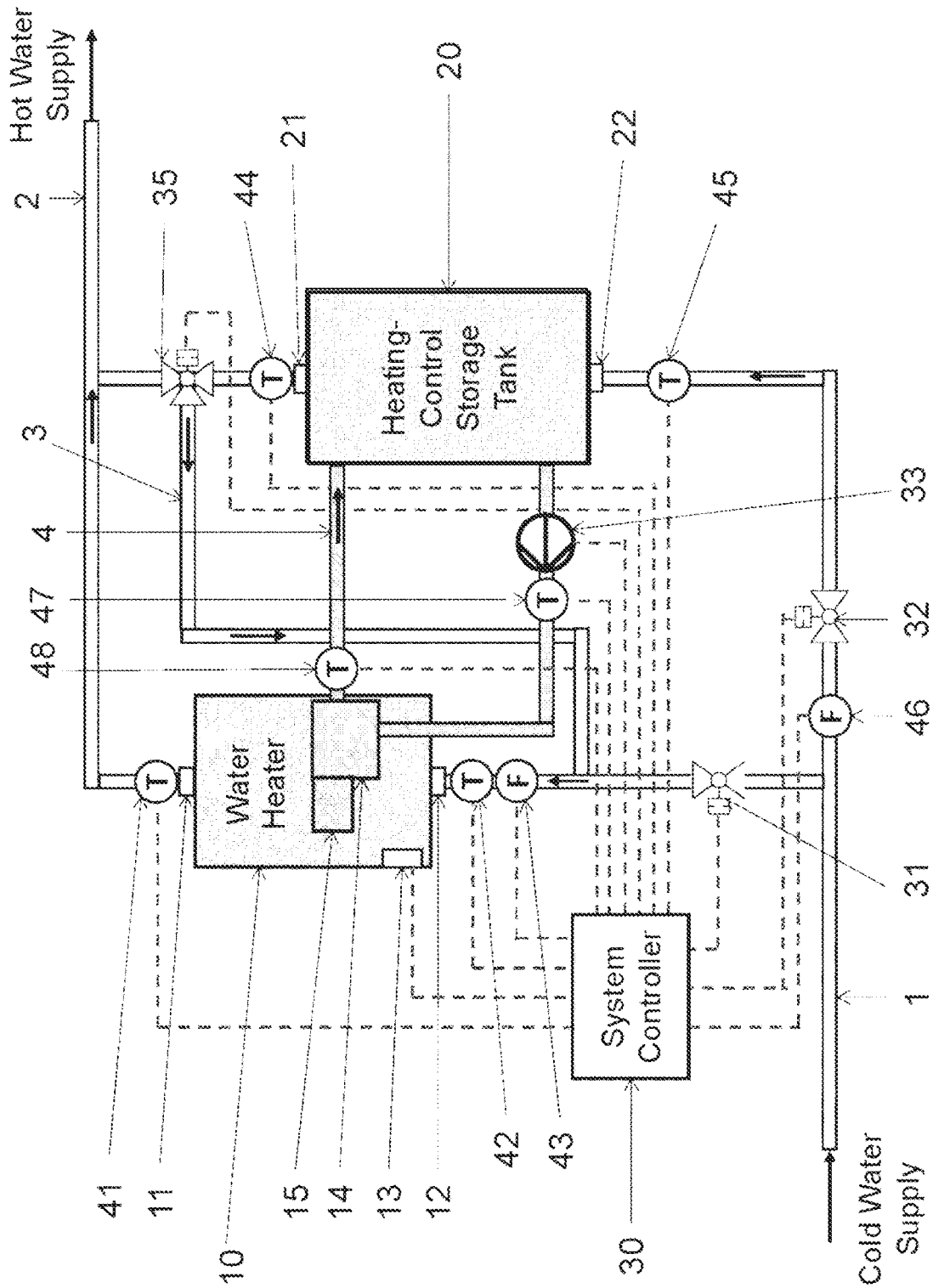
FIG. 1C illustrates a third main embodiment of a water heater system in accordance with the third set of embodiments of the present disclosure.

Regarding a Third Main Embodiment of the Invention—Heat Exchanger in the Water Heater Description of the Third Main Embodiment of the Invention:

In this embodiment, shown in FIG. 1C, two water pipes (4 and 5) are used to form a recirculation loop between the heating-control storage tank (20) and a heat exchanger (14) in the water heater (10). The heat exchanger (14), located in the water heater, may be used for heating water to be supplied by the water heater (10) or dedicated for heating water from the heating-control storage tank (20). The heat exchanger (14) is connected to at least one heating source (15), which is installed in the water heater (10) or out of, but used by the water heater (10). An electrically controlled water pump (33) is installed on water pipe #4 or water pipe #5 to enable water flow in the recirculation loop. The water heater (10) may include additional internal pipe connections and electrically activated valves to determine if the heating source (15) is used for heating water to be supplied by the water heater (10), the heating-control storage tank (20), or both. For example, if the heat exchanger (14) is also connected to a storage tank in the water heater (10), it may use a three-way valve to control if water from the storage tank in the water heater (10) or the heating-control storage tank (20) is allowed to flow into the heat exchanger (14) to be heated.

The system controller (30) activates water heating by turning on the electrically controlled water pump (33) to send water from the cold side, usually the bottom, of the heating-control storage tank (20) to the heat exchanger (14) and send heated water back to the warm side, usually the top, of the heating-control storage tank (20). At the same time, the system controller (30) also activates the heating source (15) connected to the heat exchanger (14). For example, if the heating source is a heat pump water heating device, the system controller (30) turns on the heat pump compressor; if the heating source is an electric resistance water heater, the system controller (30) turns on its power supply. If the water heater (10) has a built-in controller (13) to control the heating source (15), the built-in controller accepts control signals from the system controller (30) to control heating source operation. If the water heater (10) does not have a built-in controller, the system controller (30) controls the operation of the heating source (15) directly as well as the operation of the water heater (10). In addition to simple on and off control, the system controller (30) may set the speed of electrically controlled water pump (33) and the operating parameters of the heating source (15), depending on heating source type. For example, if the heating source is an electric resistance water heater with variable power output, the system controller (30) may set its power output.

After turning on the electrically controlled water pump (33) and activates the heating source (15), the system controller (30) monitors the temperature of water flowing out of the heating-control storage tank (20) using a temperature sensor (47). If the measured temperature exceeds a threshold value, specified in settings of the system controller (30), water in the heating-control storage tank (20) is considered to be adequately heated and the system controller (30) turns off the electrically controlled water pump (33) and deactivates the heating source (15). If heating source capacity may vary significantly during operation, the system controller (30) monitors the temperature of water flowing out of the heating source (15) using another temperature sensor (48). When the measured temperature drops below a threshold value, specified in settings of the system controller (30), the heating source (15) is considered not to have adequate heating capacity and the system controller (30) stop the heating process by turning off the electrically controlled water pump (33) and deactivates the heating source (15). If the speed of the electrically controlled water pump (33) is variable, the system control (30) may reduce pump speed to maintain the temperature measured by temperature sensor #48 to be at an acceptable level, specified in the setting of the system controller (30). When this temperature level cannot be achieved by reducing pump speed, the system controller (30) can stop the heating process by turning off the electrically controlled water pump (33) and deactivates the heating source (15).

Operation Mode:

In this third embodiment, the system can activate the heating operation to by turning on the electrically controlled water pump (33) to send water from the heating-control storage tank (20) to the heat exchanger (14) and activating the heating source (15) in the water heater (10). The system may further include heating operation modes with different speeds of the electrically controlled water pump (33) and operation parameters of the heating source (15).

The System's Operation Status is Reflected by the Following Key Parameters:

The system controller (30) commands that water in the heating-control storage tank (20) be sent to the heat exchanger (14) and the heating source (15) be activated. The system controller (30) may specify the speed of electrically controlled water pump (33) and operation parameters of the heating source (15), for example, power output for an electric resistance water heater with variable output capacity.

Control:

In this third embodiment, the operation control specifications can include when and for how long the electrically controlled water pump (33) is turned on and the heating source (15) in the water heater (10) is activated. Operation control specifications may also include speed of electrically controlled water pump (33) and operation parameters of the heating source (15).

According to this third embodiment, the system controller (30) ensures that the utilization of heating source (15) by the water heater (10) and the heating-control storage tank (20) are coordinated. In general, the system controller (30) may ensure that the water heater (10) has the priority to use the heating source (15) because the water heater (10) is the primary source of hot water supply to end users. When the water heater (10) does not have a built-in controller, the system controller (30) directly controls heating source operation. The system controller (30) may allow water heating in the heating-controlling storage tank (20) only when there is no heating demand from the water heater (10). When the water heater (10) has a built-in controller to control heating source operation, the system controller (30) may send control signals to a water heater built-in controller (13) to request for heating water in the heating-controlling storage tank (20). If the heat exchanger is used by the water heater (10), the water heater built-in controller (13) may send a signal to the system controller (30) to indicate that the heat exchanger is not available and the system controller (30) will not turn on the electrically controlled water pump (33). If there is no water heating demand in the water heater (10), the water heater built-in controller (13) may activate the heating source (15), open necessary valves, if installed, to allow water from the heating-control storage tank to flow in the heat exchanger (14), and send a signal to the system controller (30) to turn on the electrically controlled water pump (33). Once the water heater (10) has heating demand, the water heater built-in controller (13) may send a signal to the system controller (30) to turn off the electrically controlled water pump (33) and then enable water in the water heater (10) to flow into the heat exchanger (14).

After turning on the electrically controlled water pump (33) and activating the heating source (15), the system controller (30) monitors the temperature of water flowing out of the heating-control storage tank (20) using a temperature sensor (47). If the measured temperature exceeds a threshold value, specified in control settings, water in the heating-control storage tank (20) is considered to be adequately heated and the system controller (30) turns off the electrically controlled water pump (33) and deactivates the heating source (15). If heating source capacity may vary significantly during operation, the system controller (30) monitors the temperature of water flowing out of the heating source (15) using another temperature sensor (48). When the measured temperature drops below a threshold value, specified in control settings, the heating source (15) is considered not to have an adequate heating capacity and the system controller (30) stop the heating process by turning off the electrically controlled water pump (33) and deactivates the heating source (15). If the speed of the electrically controlled water pump (33) is variable, the system control (30) may reduce pump speed to maintain the temperature measured by temperature sensor #48 to be at an acceptable level, specified in the control setting. When this temperature level cannot be achieved by reducing pump speed, the system controller (30) stops the heating process by turning off the electrically controlled water pump (33) and deactivates the heating source (15).

Note that due to convection, even in the absence of pressure-induced water flow, hot water will generally rise in a storage tank, and cold water will normally fall in a storage tank, thus to some extent causing hot water to mix with cold water even in the absence of any pressure-induced water flow or mixing devices. Although even a standard water tank, with an unobstructed interior, with a cold water opening (inlet) on the bottom, and a hot water opening (outlet) on the top, will have some thermal gradient, convection will tend to diminish the extent of the thermal gradient. Thus, in some embodiments, it may be desired to configure the structure of the heating-control storage tank to further enhance its ability to maintain a thermal gradient.

Figure 1D:
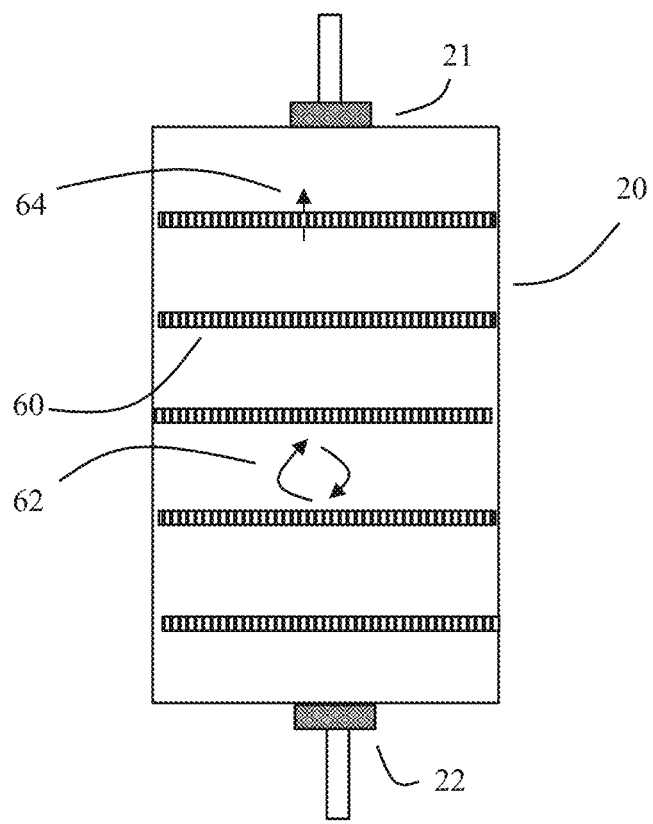
FIG. 1D shows that in some embodiments, the heating control storage tank will be configured with a plurality of internal baffles. These internal baffles, although water permeable, are configured to reduce fluid convection between the hotter end and the colder end of the heating control storage tank, thus enhancing the temperature stratification between these two ends.

FIG. 1D shows that in some embodiments, the heating control storage tank (20) will be configured with a plurality of internal baffles (60). These internal baffles, although water permeable, are configured to reduce the amount of water convection between the hotter end (21) and the colder end (22) of the heating control storage tank, thus enhancing the thermal gradient and temperature stratification between the hotter end and the colder end. Thus, in a preferred embodiment, most (e.g. 80% or more) of the heat transfer due to convection will only occur in the water stored in the areas (e.g. baffle formed compartments) between adjacent internal baffles. Heat transfer from the water stored in compartments separated by these internal baffles will primarily occur due pressure induced flow of water through the water permeable internal baffles (64), or due to thermal diffusion of heat through the baffles.

Figure 1E:
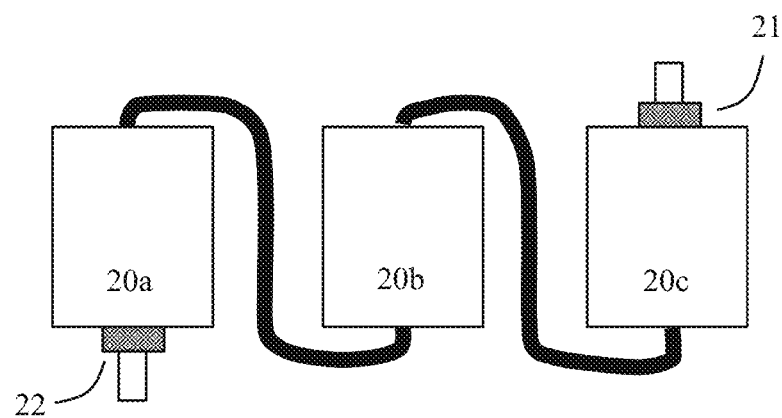
FIG. 1E shows that in some embodiments, the heating control storage tank may be comprised of a series of smaller tanks connected (by suitable water transport pipes) in series.

FIG. 1E shows that in some embodiments, the heating-control storage tank may be comprised of a series of smaller tanks (here shown as 20a, 20b, 20c) connected (by suitable water transport pipes) in series. This configuration also enhances the stratification of the heating-control storage tank by again minimizing convection between the different portions of the tank.

Figure 2:
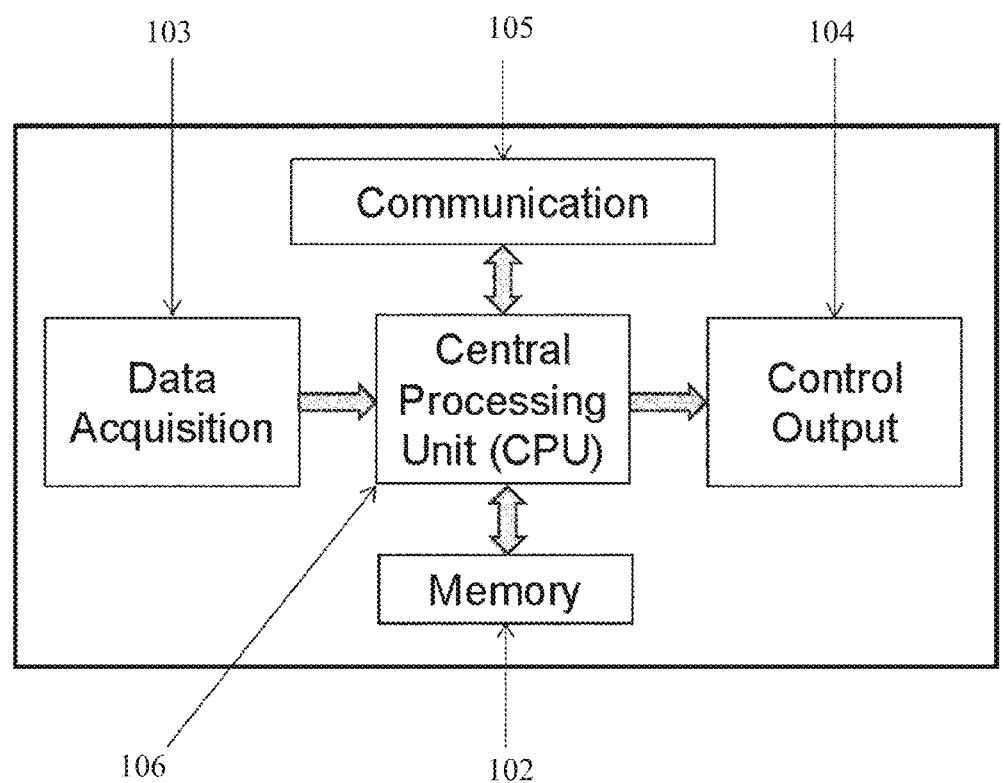
FIG. 2 illustrates the structure of a system controller in accordance with an embodiment of the present disclosure.

In many embodiments of the present invention, the normal levels of stratification achieved by using even a single heating control storage tank without any internal baffles may be entirely adequate. Such single heating control storage tanks without internal baffles can be used to shift heating load to preferred operation time periods, when electricity price is low or renewable energy is available. FIG. 2 shows a more detailed view of the invention's system controller (30).

The system controller (30) can include the following functional modules: sensors (e.g. temperature sensors) for measuring system operation status (typically associated with units (10) and (20)), data acquisition interfaces for collecting sensor signals (103), output units or actuators for sending out control signals to the various valves and pumps (104), computer interfaces to external devices, such as local temperature regulators, local computerized devices (e.g. Smartphones), or remote internet servers (105), computer memory and data storage for storing data used by the system control, as well as software used to by the system's one or more computer processors (102), and the system's one or more central processing units (CPU), (e.g. computer processor or processors) for carrying out the overall control procedures (106).

The system's sensors, processor(s) and suitable control software are used to monitor the system's operation status and provide input to make control decisions. Additionally, in buildings equipped with various forms of renewable heat generation, such as roof-top solar collectors (e.g. solar photovoltaic collectors or other solar energy collectors), the system controller can also measure the net renewable energy production of the renewable heat generation system in order to determine if, to optimize renewable energy utilization, water heating should be activated.

In some embodiments, the system's operation status can be reflected by the following key parameters:

1: The system controller (30) commands that hot water be supplied by the water heater (10).

2: In some embodiments, such as the previously discussed first main embodiment shown in FIG. 1A, the system controller (30) also commands that hot water be directed to flow from the hot water heater (10) into the heating-control storage tank (20).

3: The system controller (30) commands that hot water be supplied by the heating-control storage tank (20) or water heater makeup water be supplied from the heating-control storage tank (20).

4: The system controller (30) commands that hot water be supplied by both water heater (10) and the heating-control storage tank (20).

5: The system controller (30) monitors the temperature of the cold-water supply (1), and optimizes the system configuration accordingly.

6: The system controller (30) monitors the temperature of the hot water supplied by the water heater (10), and optimizes the system configuration accordingly.

7: The system controller (30) monitors the temperature of the hot water supplied by the heating control storage tank (20), and optimizes the system configuration accordingly.

8: The system controller (30) monitors the temperature of water returning from the heating-control storage tank (20) to the water heater (10) when the circulation pump (33) is turned on, and optimizes the system configuration accordingly.

9: The system controller (30) monitors the temperature of the mixture of water from the water heater (10) and the heating-control storage tank (20), and optimizes the system configuration accordingly.

10: The system controller (30) monitors when renewable energy (such as solar energy from photovoltaic collectors (305) is available and uses (and stores) this renewable energy by using the renewable energy and the water heater (10) to store additional hot water in the heating-control storage tank (20).

Measurement of Renewable Resource Energy, and Related Controls

As will be discussed below, one of the benefits of the present invention's heating-control storage technology is that it increases the utilization of renewable energy. In some embodiments, the invention may be configured to control water heating operation (storage filling) based on available renewable energy resources. Various methods may be used here. For example, in one embodiment, the measured net solar PV (photovoltaic) production in a building can be determined, and used by the controller (30) to control the system. In this embodiment, the net solar PV production (defined as the electric power produced by solar PV generators installed at the facility, minus the electric power consumption of the facility) is determined using sensors such as current sensors (307) and (308) in FIG. 3. These two parameters can be obtained through electric current measurements, and controller (30) can use this information to optimize its water heating functions.

Here, for example, the system operation schedules can be planned based on both projected solar PV production and building electricity consumptions. For time periods when solar PV production is expected to be higher than building electricity consumption, the system operation schedule can include an operation to fill the heating-control storage tank (30) with hot water and, therefore, trigger water heating operation (10) to consume the available free electricity produced by roof-top solar PV generators.

In general, in some embodiments of the invention, various real-time control algorithms can be used to adjust system operation according to measured net solar PV production. If the measured net solar PV production is above a threshold when the water heating system is not scheduled to fill the heating-control storage tank with hot water, the system control can be configured to turn on the recirculation pump (33) by sending commands to properly configure the electrically actuated valves accordingly. This results in the system transferring hot water from the water heater (10) to the heating control storage tank (20) to trigger water heating operation, which again consumes the available free electric power provided by solar PV (305) installed at the facility (300). This type of control strategy can also be used for other types of local renewable energy generation, such as wind energy.

Figure 3:
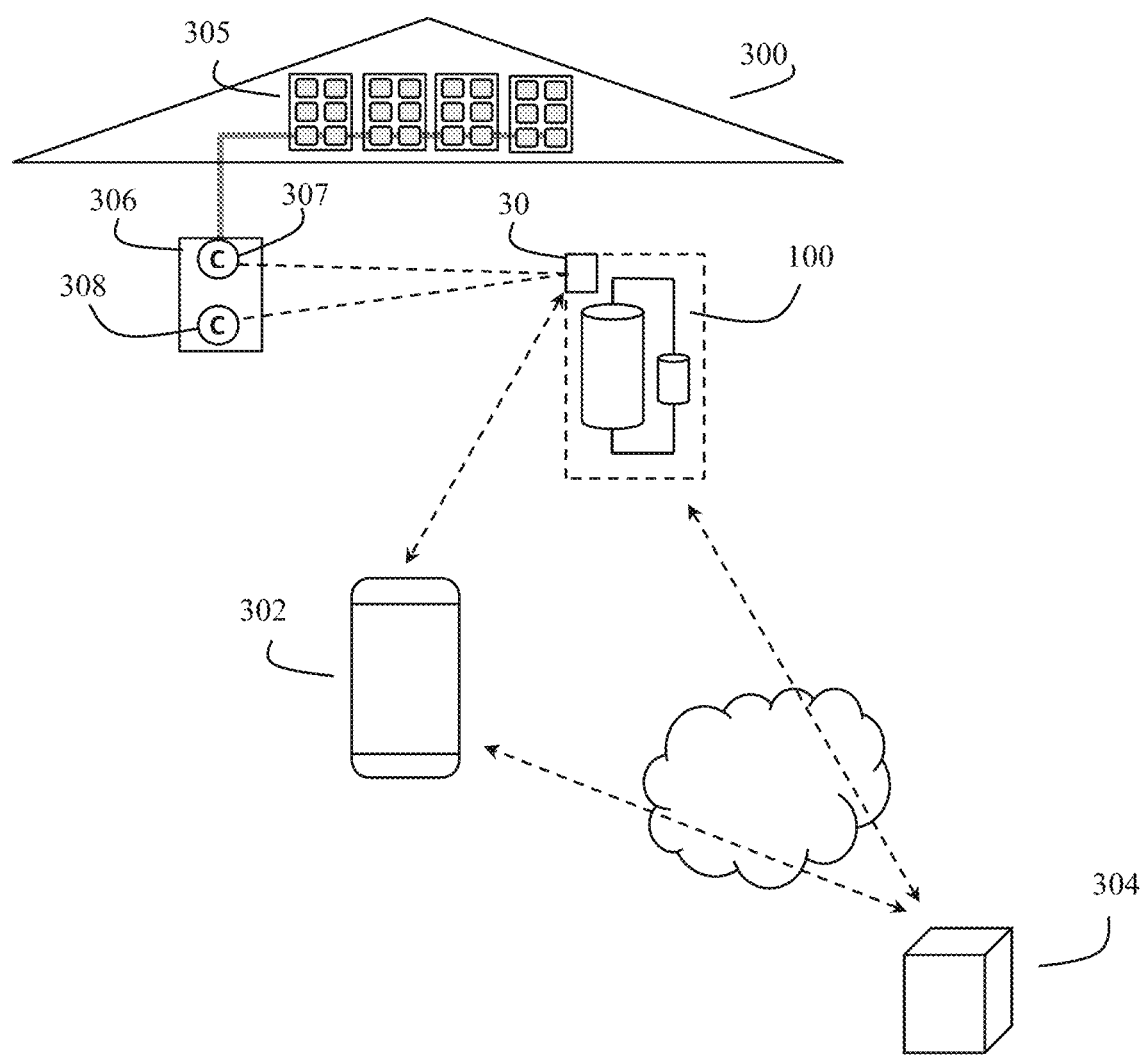
FIG. 3 shows how the hot water heater may utilize renewable energy sources such as solar photovoltaic electrical energy, and/or can also be controlled using local computerized devices such as Smartphones, or more distant internet-connected devices such as "cloud" servers.

In some embodiments, shown in FIG. 3, the system (100) (here shown installed in the house (300), and the system's control unit (30), can be configured to use wired or wireless communication to exchange data with external devices, such as external computerized devices. These external computerized devices can be a local electronic hot water heater control, a local computerized device such as a Smartphone (302) or tablet computer (here often through a Bluetooth or Wi-Fi wireless connection), or it can be a remote internet computerized device such as a remote internet server or "cloud" system (304).

In FIG. 3, the house also has a renewable energy source (shown here as solar photovoltaic panels 305) mounted on the roof. These provide renewable energy through a building electric panel (306) to the system. This renewable energy can be monitored by current sensors (307), and information from these sensors transmitted to the system controller (30) to help optimize the use of renewable energy, and reduce overall energy costs. Other current sensors, such as a sensor (308), which can be used to monitor the total current draw relative to the maximum building electrical energy load, can also be used by the system as well.

In some embodiments, the invention can be configured so that the system controller (30) exports measurements of system operation status to external devices (such as 302, 304) for display and analysis. The invention can also be configured to receive various system operation schedules (e.g. times of filling the heating-control storage tank with hot water) and control settings (e.g. desired temperature setpoint, tradeoffs as to energy costs and hot water availability/response times) from external devices (e.g. 302, 304) to help make control decisions.

More specifically, the system operation schedule can be used to define the sequence of system operation modes: when and how different valves and the recirculation pump should be operated. Times of expected hot water use and other parameters are input used to determine system operation schedule.

Suitable system operation schedules can be developed (for example in cloud servers 304) and then sent to the local system controller (30). The local system controller (30) may also develop system operation schedules based on sensor measurements and other input parameter provided by a cloud server (304) or connected mobile device (302).

In some embodiments, the overall system operation can be based on a system operation schedule aimed to optimize water heating operation (e.g. minimize energy costs) while still providing reliable hot water service.

In some embodiments, the system may be configured using an operation schedule or control algorithm that specifies different system operation modes and control settings during different times of the day. For example, in the first main embodiment shown in FIG. 1A, these operation control specifications can include when and for how long the circulation pump (33) is turned on, when the water heater (10) or the heating-control storage tank (20) are used to meet hot water demand, as well as when the temperature setpoint of the water heater (10) may be changed.

Further, if the water heater (10) uses more than one (e.g. multiple) heating technologies or modes, the system can be configured with an operation schedule or control algorithm that specifies when to use each heating technology or mode (often according to which technology or mode best optimizes various parameters such as minimizing energy costs).

These system operation schedules or algorithms can be designed based on various parameters that affect system performance, such as the design characteristics of the water heating system, the anticipated (or expected) hot water demand (either based on system historical data, user input, or a combination of the two), energy input properties (e.g. what energy sources are available, and their respective costs—which may vary as a function of time), ambient conditions (e.g. intake water temperatures), and various optimization objectives. If these parameters are changed, system operation schedule or control algorithms can be updated and sent to the system controller (30) through its communication interface (105).

In applications where there is no reliable internet connection, the system controller (30) may also be configured to have the capability to update the system operation schedule. For example, the system controller (30) can include a program to analyze the measured hot water usage data to automatically develop an updated usage forecast, and then to update the operation schedule accordingly.

During real-time operation, the system controller (30) can be configured to continually monitor system operation status and make necessary adjustments to system operation schedule and system settings to help ensure optimal system performance is achieved. Here, adjustments can be made based on various control settings, such as the following three control settings:

Minimum hot water supply temperature: minimum temperature required to provide satisfactory hot water service through hot water supply (2).

Minimum hot water filling temperature: minimum hot water temperature required from the water heater (10) to fill the heating-control storage tank (20). Because of heat loss during the filling process, as well as by the mixing of water and insulation losses in the heating-control storage tank, this temperature may often be higher than the minimum hot water supply temperature (2).

Maximum storage return temperature: This temperature threshold is close to the minimum hot water supply temperature. When the circulation pump (33) is turned on to fill the heating-control storage tank (20) with hot water, if the temperature of water coming out of the cold-water inlet port (22) is higher than the maximum storage return temperature, it indicates the heating-control storage tank (20) is fully filled with hot water.

Various types of adjustments to the system operation schedule can differ between the various main embodiments (e.g. the embodiments shown in FIGS. 1A, 1B, and 1C). Some examples are shown below.

In some embodiments, such as the first main embodiment shown in FIG. 1A, the system controller (30) can be configured so that either before or after it has commanded that the circulation pump (33) run, if the system controller also detects that the temperature of the hot water supplied by the water heater (10), measured by temperature sensor (41), drops below the minimum hot water filling temperature, the circulation pump operation (33) will be terminated.

According to the first main embodiment, this system controller configuration helps ensure that temperature of the hot water filled into the heating-control storage tank (20) will be high enough to provide satisfactory hot water service. The minimum hot water filling temperature is usually set to be higher than the minimum hot water supply temperature so that the circulation pump operation (33) is terminated before the temperature of the hot water supplied by the water heater (10) drops below the minimum hot water supply temperature. This helps insure that when the water heater (10) is used to provide hot water, there is enough hot water left in the water heater (10) to meet hot water demand.

Thus, according to the first main embodiment, when the circulation pump (33) is running and the temperature of water, as measured by temperature sensor (44) returning from the heating-control storage tank (20), to the water heater (10) becomes higher than the maximum storage return temperature, this indicates that the heating-control storage tank (20) is fully filled with hot water. The system controller (30) can be configured to stop the circulation pump (33) when this occurs.

In some or all embodiments, such as the embodiments shown in FIGS. 1A, 1B, and 1C, the system controller (30) can be configured so that when the water heater (10) is used to supply hot water, and its hot water supply temperature (as measured by temperature sensor 41), drops below the minimum hot water supply temperature, system controller (30) will use the heating-control storage tank (20) to supply hot water (assuming that hot water is available in 20).

The system controller (30) can also be configured so that when the hot water supply temperatures of both the water heating equipment (10) and the heating-control storage tank (20) are lower than the minimum hot water supply temperature, system controller will turn on whatever water heating technology or water heating mode that has the highest heat generating capability. For example, in this situation, the system controller (30) may turn on a large electric resistance heater (if it is available). This is because in this situation, the system is at risk of not meeting the minimum hot water supply requirements, so in this situation, operating at a higher economy (e.g. lower energy costs) may be less important than performance.

The system controller (30) can also be configured so that when the heating-control storage tank (20) is used to supply hot water and its hot water supply temperature (as measured by temperature sensor 44), drops below the minimum hot water supply temperature, the system controller (30) can direct the water heater (10) to supply hot water. The system controller (30) may additionally direct the heating-control storage tank (20) (via appropriate valves) to provide warm makeup water to the water heater (10).

Although the above discussion focused on control methods that use temperature measurements, other types of sensors and control methods are also possible. For example, the system may alternatively or additionally use water flow sensors to determine water flow, and the system controller (30) may use this flow sensor data to enhance system operation schedule and real-time control adjustment.

In this later embodiment, the system may additionally use water flow sensors, such as water flow sensors (43) and (46).

In this water flow sensor embodiment, water flows into the water heater (10) are measured by flow sensor (43), and water flows into the heating-control storage tank (20) are measured by flow sensor (46). Since typically any flow into a tank is balanced by flow out of the tank, these flows also reflect flow out of the water heater (10) and the heating-control storage tank (20), respectively.

In some embodiments, the system controller (30) can, in addition to the previously discussed temperature sensors and measurements, also keep track of the water flow and the amount of hot water energy stored in the heating-control storage tank (20). Here hot water "energy" can be indicated by the product of the temperature difference between the hot water and cold-water supply, the volume of water, density of water, and heat capacity of water. That is, hot water energy=temperature above the cold-water supply*volume of water*density of water*heat capacity of water. Hot water energy stored in the heating-control storage tank (20) can be estimated as the initially stored hot water energy (it is typically assumed to be zero when it is at ambient temperature), adding the total hot water energy gained when hot water is filled into the heating-control storage tank (20), subtracting the hot water energy removed from the heating-control storage tank (20) when it is used to provide hot water to end users through the hot water supply (2) or makeup water to the water heater (10), and subtracting heat loss due to imperfect heating-control storage tank insulation.

If the stored hot water energy in both the water heater (10) and the heating-control storage tank (10) is below a threshold value, system controller (30) can, as previously discussed, turn on the water heating technology or water heating mode with the highest heat capacity, for example a large electric resistance heater, if it is available.

However, an additional advantage of measuring flow rates is that by making measurements of the water flows going into the water heater (10) and the heating-control storage tank (20), the system can better determine the user hot water consumption pattern of the facility (300) where the water heating system (100) is installed. The system controller (30) can store this flow and temperature measurement data in memory (either local memory (102) or remote memory such as in cloud server (204).

The invention's system controller (30) can be configured to store both flow and temperature measurement data as a function of time in order to allow system operators (or a computer program) to analyze hot water consumption patterns. These patterns (or system operator commands) can then be used to update the system's operation schedule so as to provide adequate amounts of hot water, on time, while minimizing system energy costs.

In some embodiments, the invention's system controller (30) can also be configured to also use the flow measurement information to improve the accuracy of the system's temperature measurements. This is because at least for pipe mounted temperature sensors, such temperature sensors can correctly (or at least most accurately) measure temperatures of water flowing into or out of the water heater (10) or the heating-control storage tank (20) when there is water flow in the corresponding water pipe. If the water in the pipe is not moving (not flowing), there is a higher risk that the measured temperatures will be affected by ambient air temperatures.

Thus, system controls (30) that only use temperature measurements from temperature sensors installed on water pipes with water flow to make control decisions, may be less satisfactory than system controls (30) that incorporate both water flow and temperature measurements. Thus, in some embodiments, which may even be preferred embodiments, the invention will utilize both temperature sensors and water flow sensors.

Software flow charts, showing specific examples of various algorithms that can be used by the system controller are discussed below.

To better follow the software discussion, it may be helpful to restate the invention in a methods format. From a methods perspective, the invention may be a method of improving an efficiency of a processor-controlled (e.g. controller 30) hot water heating system. This system will obtain water from a cold-water supply (1) and deliver a user hot water supply (2). This method can comprise obtaining cold water from the cold-water supply (1), and then manipulating this water as directed by the processor (30). For example, the processor (30) can be used to direct the cold water (1) to any of an inlet port (12) of a hot water heater (10) and an inlet port (22) of a stratified temperature heating-control storage tank (20). The processor (30) can also be used to direct (e.g. by using valve 35) hot water (e.g. from port 11 of the hot water heater 10) to any of a user hot water supply (2) and/or to an outlet port (21) (here used more as an inlet port) of a stratified temperature heating-control storage tank (20). The processor (30) can also be used to direct warm water (essentially being used as makeup water) from said inlet port (22) (here used more as an outlet port) of a stratified temperature heating-control storage tank (20) to the inlet port (12) of the hot water heater (10). The processor (30) can also be used to direct hot water from the outlet port (21) (here it really is acting as an outlet port) of the stratified temperature heating-control storage tank (20) to any of said user hot water supply (2), and/or the inlet port (12) (again essentially being used as makeup water) of the hot water heater (10). Various embodiments of the invention can implement various permutations of the above functions, and some embodiments may be configured to implement all of the above functions.

Figure 4:
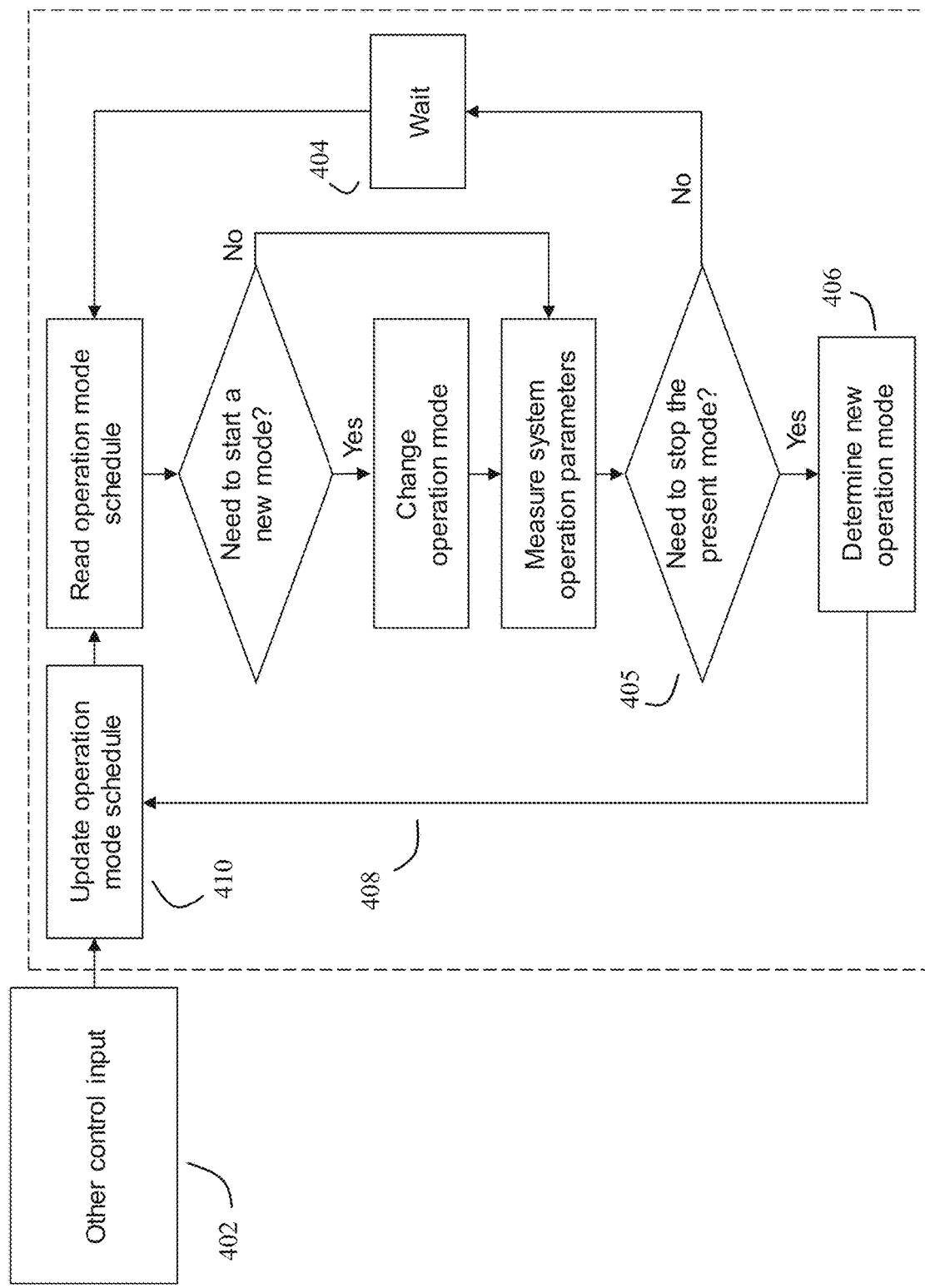
FIG. 4 shows a flow chart showing an example of an overall real-time control sequence (e.g. control sequence software) that can be used by the system controller.

FIG. 4 shows a flow chart showing an example of an overall real-time control sequence (e.g. control sequence software) that can be used by the system controller. Normally the controller will look through its time schedule of operation modes (e.g. operation mode schedule), and either it is time to start a new operation mode, or alternatively if the measured system parameters show that it is appropriate to change the operation mode, then if the system needs to stop its present operation mode, it will determine the next or new operation mode, update the operation mode schedule as appropriate, and continue on with this process indefinitely. If there is no actual need to stop the present operating mode (for example, the system operating parameters indicate that no change in operation mode is required), then the system will wait (404) for a predetermined period of time, often on the order of about 1 seconds to 5 minutes, and then continue with the process of checking to see if a new operation mode is needed.

If the system determines, either by the timing schedule, or by measurement of system operating parameters, that a new operation mode is required, it will determine the new operation mode (406), and add (408) this new operation mode into the operation mode schedule (410) as the next operation step.

Figure 5:
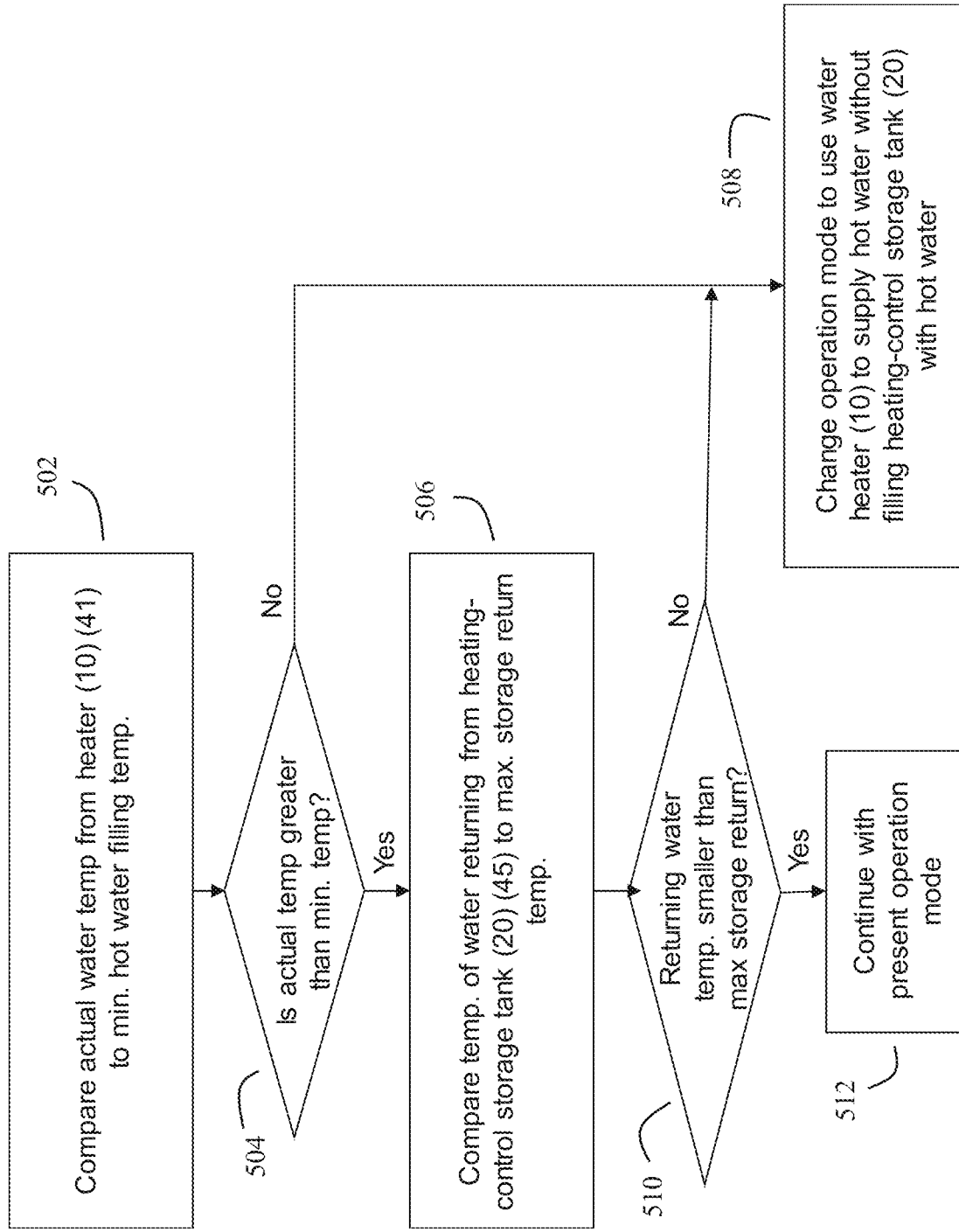
FIG. 5 shows a flow chart showing an example of one type of control sequence for determining new operation modes (operation mode control software) that can be used by the system controller. This particular algorithm can be used during times when the controller has set the system's operation mode to fill the heating-control storage tank with hot water.
Figure 6:
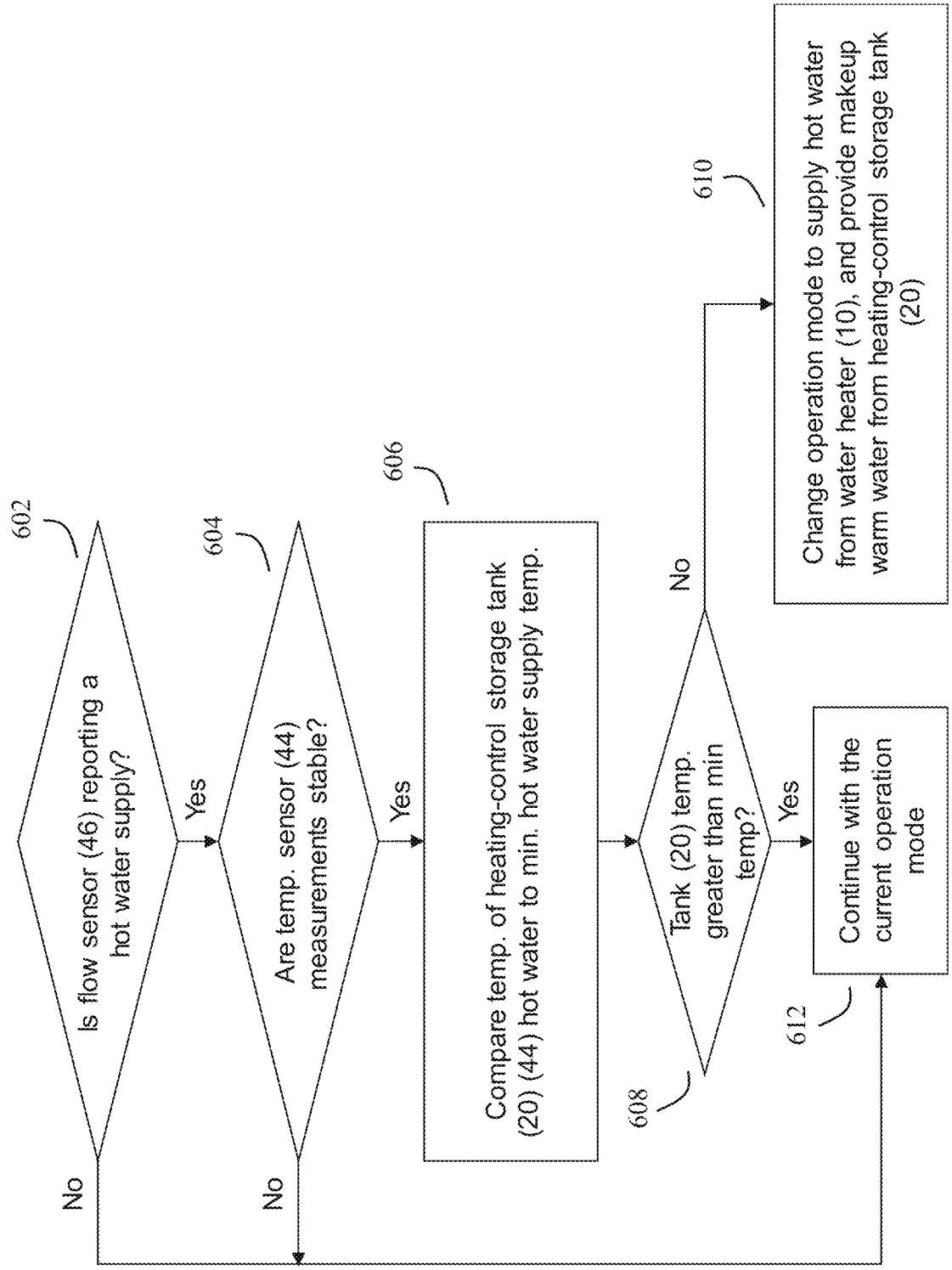
FIG. 6 shows a flow chart showing an example of another type of control sequence for determining new operation modes (operation mode control software) that can be used by the system controller. This particular algorithm can be used during times when the controller has set the system's operation mode to use the heating-control storage tank to supply hot water.

More details regarding the algorithms that the system uses to determine if it needs to stop the present operation mode (405), and to determine the new operation mode (406), are shown in FIGS. 5 and 6.

If other control input (402), (which can be various types of control input, including input from the user(s) (for example via remote control or via commands, such as wireless commands from a mobile computerized device such as a smartphone, or commands received over the Internet from authorized control sources, as well as input from other software configured to optimize the performance of the system) is received then the operation mode schedule can also be updated accordingly (410).

FIG. 5 shows a flow chart showing an example of one type of control sequence for determining new operation modes (operation mode control software) that can be used by the system controller at, for example, previously discussed steps (405) and (406). This particular algorithm can be used during times when the controller has set the system's operation mode to fill the heating-control storage tank (20) with hot water.

To determine if the controller needs to stop the present operation mode (previously shown in 405), according to the algorithm in FIG. 5, at step (502), the controller will automatically compare the temperature of the hot water supplied by the water heater (10), (here by using temperature sensor (41), to a previously determined minimum hot water filling temperature value, which is generally stored in controller memory (102).

If (step 504) the controller determines (usually with temperature sensor 41) that the temperature of the hot water supplied by water heater (10) is larger than the previously determined minimum lot water filling temperature then the controller will do some additional checking and decision making. Specifically, at step (506), the controller will compare (usually by using temperature sensor 45) the temperature of the water returning from the heating-control storage tank (20) to a maximum storage return temperature value, which is generally stored in controller memory (102).

If (510) the temperature of the water returning from the heating-control storage tank (20) is smaller than the maximum storage return temperature value, then the system will continue to operate in the present operation mode. However. if (510) the temperature of the water returning from the heating-control storage tank (20) is equal to or larger than the maximum storage return value, then the controller will change (e.g. by configuring automatic valves) the system's operating mode to a "new" or alternate mode (508) in which the system now uses the water heater (10) to supply the hot water, without filling the heating control storage tank (20) with additional hot water.

Viewing certain aspects of FIG. 5 from a software and methods perspective, among other teaching, FIG. 5 teaches that according to the invention, when the processor (30) is configured to presently direct hot water from the outlet port (11) of the hot water heater (10) to the outlet port (21) (here acting more as an inlet port) of the stratified temperature heating-control storage tank (20), there are situations where the processor may alter the configuration of the system.

Here for example, if the processor determines (e.g. with suitable temperature sensors such as 41) that hot water (e.g. from outlet port 11) from the hot water heater (10) has a temperature less than a predetermined minimum hot water filling temperature (i.e. not hot enough to be worth filling the heating-control storage tank 20), then the processor can tell the hot water heater to stop filling the heating-control storage tank. Instead, the processor can configure the system's valves or pumps to direct the hot water (from port 11) of the hot water heater (10) to just the user hot water supply (2). So, when the hot water heater output is very hot, it is OK to use at least some of it to fill the heating-control storage tank, but if it is just marginally hot, forget about filling the heating-control storage tank (20), and just send hot water to the users (2).

Certain aspects of FIG. 5 also teach that again, when the processor (30) is configured to presently direct hot water from the outlet port (11) of the hot water heater (10) to the outlet port (21) (here acting more as an inlet port) of the stratified temperature heating-control storage tank (20), there are other situations where the processor may also alter the configuration of the system. If the processor (30) determines (possibly by using temperature sensor 41) that hot water (from outlet port 11, here actually being used as an outlet port) from the hot water heater (10) has a temperature greater than a predetermined minimum hot water filling temperature (for the heating-control storage tank 20). And additionally, the processor also determines (possibly by using temperature sensor 45) that warm water (from heating control storage tank inlet 22, here being used more as an outlet) that may be presently returning (to the hot water heater inlet 12) as makeup water from the heating control storage tank (20) to the hot water heater (10) is greater than a predetermined maximum storage return temperature (i.e. even the "cold" side of the heating control storage tank is now pretty hot), then the processor (30) can be used to direct the hot water (from hot water heater exit port 11) from the hot water heater (10) to only go to the user hot water supply (2). Essentially here, the whole heating control storage tank, including the cold side near (22), is now quite hot, so there is no point in trying to send still more hot water to it. Instead, stop trying to fill up an already hot heating-control storage tank with water, and instead just send the hot water from (11) and (10) directly to the user (2). Here the hot water stored in the heating control storage tank (20) can be saved for later use.

FIG. 6 shows a flow chart showing an example of another type of control sequence for determining new operation modes (operation mode control software) that can be used by the system controller also at, as another example, previously discussed steps (405) and (406). This particular algorithm can be used during times when the controller has set the system's operation mode to use the heating-control storage tank (20) to supply hot water.

At step (602), the controller can use data from the flow sensor (46) to determine if there is a demand for hot water (e.g. the system is providing a hot water supply 2). The controller (604) can also use temperature data from temperature sensor (44) to determine if the system is able to provide hot water at a stable temperature. If there is no demand for hot water, or if the temperature of the hot water provided by the heating and storage tank is stable with time, then the system can simply continue in the present operating mode (512).

However, if the flow sensor shows that there is a demand for hot water, and the temperature sensor measurements are not stable with time, then something may need to be done. To determine what do to, the controller at step (606) uses temperature sensor (44) to compare the temperature of the hotter end of the heating-control storage tank (20) with a preset minimum hot water supply temperature value, which is usually stored in controller memory (102).

If (608), the temperature of the hot water supplied by the heating-control storage tank (20) is less than or equal to the preset minimum hot water supply temperature value in controller memory (102), then (see step 610) the controller will switch (by controlling the state of the water valves) the system to a new (e.g. different) operating mode in which the system will now use warm water from the heating-control storage tank (20) as the make-up water. Here the water heater (10) inlet (12) is configured to receive water from the heating-control storage tank (20) outlet (21) as makeup water (as previously discussed, makeup water is water which is added to compensate for losses, such as compensating for the loss of water when water is removed from a storage tank).

However, if the temperature of the hot water supplied by the heating-control storage tank (20) is greater than the preset minimum hot water supply temperature value in controller memory (102), then the system can continue with the current operation mode (612), which is to continue to fill the heating-control storage tank (20) with hot water from water heater (10).

Put in methods format, FIG. 6 is essentially teaching that in the situation where the processor (30) has presently directed the system to direct hot water (using outlet port 21 and valve 35) from the heating-control storage tank (20) to the user hot water supply (2), there are some situations where the processor may decide to change this system configuration. For example, if the processor detects water flowing through the system (e.g. water flowing in from the cold-water supply (1) and/or out through the user hot water supply (2), perhaps by using flow sensor (46)). And the processor also detects that the temperature of the hot water (e.g. from outlet port 21) from the heating-control storage tank (20) to the user hot water supply (2) is stable (i.e. the heating-control storage tank is still supplying an adequate amount and temperature of water to the user). But the processor also determines that the temperature of the hot water from the stratified temperature heating-control storage tank (20) is less than a predetermined minimum hot water supply temperature (i.e. still presently OK enough for the user, but not much hotter than that). Then the processor can be used to direct the hot water (e.g. from outlet port 11) from the hot water heater (10) to only the user hot water supply (2), and now direct warm water (e.g. from inlet port 22, here being used as an outlet port) from the heating-control storage tank (20) to provide makeup water to the hot water supply (10). Put alternatively, if the heating control tank (20) was being used to supply hot water to the user (2), but now is just barely hot enough, switch back to using the hot water heater (10) to supply the user (2), and make use of the "warm" water in the cooler side of the heating-control storage tank to provide makeup water to the hot water heater (10) which is still likely going to be warmer than the cold water supply (1), and thus will reduce the energy needed to heat it up still further.

The invention claimed is:

1. A hot water heating system, comprising:
   at least one water heater with at least one water heater inlet and at least one outlet configured to use at least one electronically controlled energy source to heat water;
   said system further comprising a system controller and a plurality of sensors;
   at least one heating-control storage tank with at least one heating-control storage tank inlet, and
   said water heater and said heating-control storage tank connected to a cold-water supply, with electronically actuated valves, controlled by said system controller, directly controlling flow of cold water into both said at least one water heater inlet and said at least one heating-control storage tank inlet of said heating-control storage tank;
   said water heater and said heating-control storage tank configured so that at least thermal energy can be transferred between said water heater and said heating-control storage tank; and
   said water heater and said heating-control storage tank further coupled with suitable pipes and electronically actuated valves to a hot water supply pipe so that hot water can be directly supplied by any of at least one water heater tank outlet or at least one heating-control storage tank outlet;
   said system controller configured to control at least said electronically actuated valves so as to supply hot water according to user needs while minimizing energy costs associated with said at least one electronically controlled energy source.

2. The system of claim 1, wherein said heating-control storage tank has a warm side and a cold side, and wherein said system is further configured with an electronically controlled water recirculation pump configured to enable water flow in a recirculation loop to send water from said cold side of said heating-control storage tank to said at least one water heater and send heated water from said at least one water heater to said warm side of said heating-control storage tank.

3. The system of claim 1, wherein said sensors comprise any of temperature sensors and water flow sensors.

4. The system of claim 1, wherein said system controller comprises at least one computer processor, memory, computer communication interface, sensor data acquisition inputs, control outputs to drive said electronically actuated valves, and control software.

5. The system of claim 4, wherein said system controller is configured to send and receive information and commands from any of local computerized devices and remote internet servers.

6. The system of claim 1, wherein said at least one heating-control storage tank is configured to store water in a stratified configuration where warmer water is separated from colder water, said warmer water being associated with said at least one heating-control storage tank outlet; said colder water being associated with said at least one heating-control storage tank inlet;
   wherein said at least one heating-control storage tank is further configured with any of:
   a) a plurality of internal baffles configured to reduce water convection between said heating-control storage tank inlet and said heating-control storage tank outlet; and
   b) a plurality of tanks configured to store water in a temperature stratified manner.

7. The system of claim 1 wherein said system further uses a hot water heater controller to control the heating of said water heater.

8. The system of claim 1, wherein said system further uses said system controller to control the heating of said water heater.

9. The system of claim 1, wherein said system controller is further configured to use renewable energy sources to control said system.

10. The system of claim 1, wherein said water heater has a water heater storage volume.

11. The system of claim 1, wherein said water heater and said heating-control storage tank are further configured with suitable pipes and electronically actuated valves to supply water to and receive hot water from the water heater according to:
    a) said at least one water heater inlet can receive water from said at least one heating-control storage tank outlet; and
    b) said at least one heating-control storage tank outlet can receive hot water from said at least one water heater outlet.

12. The system of claim 1, wherein said at least one heating-control storage tank further comprises a storage tank heating fluid heat exchanger, and wherein said water heater further comprises a water heater heating fluid heat exchanger, and wherein said water heater is further configured to recirculate a heating fluid between said water heater heating fluid heat exchanger and said storage heating fluid heat exchanger, thus transmitting thermal energy between said water heater and said at least one heating-control storage tank; and wherein said heating fluid can comprise any of an aqueous and a non-aqueous heating fluid.

13. The system of claim 1, wherein a heat pump type heating fluid heat exchanger, configured to operate by exchange of heat between any of a refrigerant and other fluid, and water in said water heater, is configured outside of said heating-control storage tank and is further configured either inside or outside of said water heater, and wherein said heating-control storage tank is also heated by pumping water between said heating-control storage tank and said heat exchanger.

14. The system of claim 1, wherein said heating-control storage tank has a warm side and a cold side.

15. A method of improving an efficiency of a processor controlled hot water heating system that obtains water from a cold-water supply and delivers a user hot water supply, said method comprising:

obtaining cold water from said cold water supply;

using said processor to direct said cold water to any of an at least one inlet port of a hot water heater and an at least one inlet port of a heating-control storage tank;

using said processor to direct hot water from said hot water heater to any of a user hot water supply and an at least one outlet port of a heating-control storage tank;

using said processor to direct water from any of said at least one inlet or at least one outlet port of a heating-control storage tank to said at least one inlet port of said hot water heater;

using said processor to direct hot water from said at least one outlet port of said heating-control storage tank to any of said user hot water supply, and said at least one inlet port of said hot water heater.

16. The method of claim 15, wherein said processor is configured to presently direct hot water from said hot water heater to said at least one outlet port of said heating-control storage tank; and determining, using said processor, that said hot water from said hot water heater has a temperature less than a predetermined minimum hot water filling temperature;

and using said processor to direct said hot water from said hot water heater to only said user hot water supply.

17. The method of claim 15, wherein said processor is configured to presently direct hot water from said hot water heater to said at least one outlet port of said heating-control storage tank; and determining, using said processor, that said hot water from said hot water heater has a temperature greater than a predetermined minimum hot water filling temperature; and determining, using said processor, that said water returning as makeup water from said heating control storage tank to said hot water heater is greater than a predetermined maximum storage return temperature; and using said processor to direct said hot water from said hot water heater to only said user hot water supply.

18. The method of claim 15, wherein said processor is configured to presently direct hot water from said heating-control storage tank to said user hot water supply; and detecting, using said processor, water flow on any of said cold water supply and user hot water supply;

detecting, using said processor, that a temperature of hot water from said heating-control storage tank to said user hot water supply is stable;

determining, using said processor that a temperature of said hot water from said heating-control storage tank is less than a predetermined minimum hot water supply temperature; and using said processor to direct said hot water from said hot water heater to only said user hot water supply, and to direct warm water from said heating-control storage tank to provide makeup water to said hot water supply.

19. The method of claim 15, wherein said processor uses at least one temperature sensor to determine any of a temperature of said hot water from said hot water heater, a temperature of warm water returning as makeup water from said heating-control storage tank, and a temperature of hot water from said heating-control storage tank; and wherein said processor uses at least one flow sensor to determine water flow on any of said cold water supply and user hot water supply; and wherein said processor uses any of processor controlled electronically actuated water valves or water pumps to direct said cold water to any of an at least one inlet port of a hot water heater and an at least one inlet port of a heating-control storage tank, direct hot water from said hot water heater to any of a user hot water supply and an at least one outlet port of a heating-control storage tank, to direct water from any of said at least one inlet or at least one outlet port of a heating-control storage tank to said at least one inlet port of said hot water heater, and direct hot water from said at least one outlet port of said heating-control storage tank to any of said user hot water supply, and said at least one inlet port of said hot water heater.

20. The method of claim 15, wherein said at least one heating-control storage tank is configured to store water in a stratified configuration where warmer water is separated from colder water, said warmer water being associated with said heating-control storage tank outlet; said colder water being associated with said heating-control storage tank inlet;

wherein said at least one heating-control storage tank is further configured with any of:
a) a plurality of internal baffles configured to reduce water convection between an inlet port of said heating-control storage tank and an outlet port of said heating-control storage tank; and
b) a plurality of tanks configured to store water in a temperature stratified manner.

21. The method of claim 15, wherein said processor is further configured to operate according to a preset time schedule;

said processor uses said preset time schedule to configure said hot water heating system for any of:
a) using said water heater to fill said heating-control storage tank with hot water, and use said hot water heater to supply hot water for said user hot water supply;
b) using only said heating-control storage tank to supply hot water for said user hot water supply;
c) using only said water heater to supply hot water for said user hot water supply.

22. The method of claim 15, wherein said heating-control storage tank has a warm side and a cold side, and wherein said method further uses an electronically controlled water recirculation pump to enable water flow in a recirculation loop to send water from said cold side of said heating-control storage tank to said at least one water heater and send heated water from said at least one water heater to said warm side of said heating-control storage tank.

* * * * *